(12) United States Patent
Gidwani et al.

(10) Patent No.: US 10,573,913 B2
(45) Date of Patent: Feb. 25, 2020

(54) SYSTEM AND METHOD FOR CONVERTING CHEMICAL ENERGY INTO ELECTRICAL ENERGY USING NANO-ENGINEERED POROUS NETWORK MATERIALS

(71) Applicant: QUSWAMI, INC., San Francisco, CA (US)

(72) Inventors: Jawahar Gidwani, San Francisco, CA (US); Arash Hazeghi, San Francisco, CA (US); Andrew Lam, San Francisco, CA (US); Attila Horvath, Berkeley, CA (US)

(73) Assignee: QUSWAMI, INC., San Francisco, CA (US)

( * ) Notice: Subject to any disclaimer, the term of this patent is extended or adjusted under 35 U.S.C. 154(b) by 555 days.

(21) Appl. No.: 15/130,386

(22) Filed: Apr. 15, 2016

(65) Prior Publication Data

US 2016/0248098 A1     Aug. 25, 2016

Related U.S. Application Data

(63) Continuation of application No. 13/945,864, filed on Jul. 18, 2013, now Pat. No. 9,437,892.

(Continued)

(51) Int. Cl.
*H01M 8/10* (2016.01)
*B82Y 30/00* (2011.01)
(Continued)

(52) U.S. Cl.
CPC ............... *H01M 8/10* (2013.01); *B82Y 30/00* (2013.01); *H01M 4/8605* (2013.01);
(Continued)

(58) Field of Classification Search
CPC .... H01M 8/10; H01M 4/8605; H01M 4/8647; H01M 4/8652; H01M 4/8657;
(Continued)

(56) References Cited

U.S. PATENT DOCUMENTS 3,483,040 A    12/1969   Parkins
3,510,797 A    5/1970    Nieuwpoort
(Continued)

FOREIGN PATENT DOCUMENTS

DE    1230509 B    12/1966
EP    0713089      5/1996
(Continued)

OTHER PUBLICATIONS

Achermann, M. et al., Carrier dynamics around nano-scale Schottky contact; a femtosecond near-field study, Applied Surface Science 7659 (2002) 1-4.
(Continued)

*Primary Examiner* — Gary D Harris
(74) *Attorney, Agent, or Firm* — Arnold & Porter Kaye Scholer

(57) ABSTRACT

An energy conversion device for conversion of chemical energy into electricity. The energy conversion device has a first and second electrode. A substrate is present that has a porous semiconductor or dielectric layer placed thereover. The porous semiconductor or dielectric layer can be a nano-engineered structure. A porous catalyst material is placed on at least a portion of the porous semiconductor or dielectric layer such that at least some of the porous catalyst material enters the nano-engineered structure of the porous semiconductor or dielectric layer, thereby forming an intertwining region.

37 Claims, 12 Drawing Sheets

Related U.S. Application Data

(60) Provisional application No. 61/676,285, filed on Jul. 26, 2012, provisional application No. 61/712,712, filed on Oct. 11, 2012, provisional application No. 61/716,889, filed on Oct. 22, 2012, provisional application No. 61/724,764, filed on Nov. 9, 2012.

(51) Int. Cl.
| | |
|---|---|
| *H01M 4/86* | (2006.01) |
| *H01M 14/00* | (2006.01) |
| *H01M 8/1004* | (2016.01) |
| *H01M 8/22* | (2006.01) |
| *H01M 4/90* | (2006.01) |
| *H01M 4/92* | (2006.01) |

(52) U.S. Cl.
CPC ....... *H01M 4/8626* (2013.01); *H01M 4/8647* (2013.01); *H01M 4/8652* (2013.01); *H01M 4/8657* (2013.01); *H01M 8/1004* (2013.01); *H01M 14/00* (2013.01); *H01M 4/9025* (2013.01); *H01M 4/92* (2013.01); *H01M 4/925* (2013.01); *H01M 8/22* (2013.01); *H01M 8/225* (2013.01); *Y02E 60/50* (2013.01)

(58) Field of Classification Search
CPC ........ H01M 14/00; H01M 8/22; H01M 8/225; H01M 4/9025; H01M 4/92; H01M 4/925; B82Y 30/00; Y02E 60/50
USPC ........................................... 429/479
See application file for complete search history.

(56) References Cited

U.S. PATENT DOCUMENTS

| | | |
|---|---|---|
| 3,694,770 A | 9/1972 | Burwell et al. |
| 3,916,338 A | 10/1975 | Jensen et al. |
| 3,925,235 A | 12/1975 | Lee |
| 4,012,301 A | 3/1977 | Rich et al. |
| 4,045,359 A | 8/1977 | Fletcher et al. |
| 4,407,705 A | 10/1983 | Garscadden et al. |
| 4,590,507 A | 5/1986 | Capasso et al. |
| 4,634,641 A | 1/1987 | Nozik |
| 4,651,324 A | 3/1987 | Prein et al. |
| 4,686,550 A | 8/1987 | Capasso et al. |
| 4,753,579 A | 6/1988 | Murphy |
| 4,756,000 A | 7/1988 | Macken |
| 4,793,799 A | 12/1988 | Goldstein et al. |
| 4,849,799 A | 7/1989 | Capasso et al. |
| 5,048,042 A | 9/1991 | Moser et al. |
| 5,057,162 A | 10/1991 | Nelson |
| 5,124,610 A | 6/1992 | Conley et al. |
| 5,293,857 A | 3/1994 | Meyer |
| 5,299,422 A | 4/1994 | Nakagawa et al. |
| 5,311,009 A | 5/1994 | Capasso et al. |
| 5,317,876 A | 6/1994 | Nakagawa et al. |
| 5,337,329 A | 8/1994 | Foster |
| 5,362,975 A | 11/1994 | von Windheim et al. |
| 5,404,712 A | 4/1995 | Few et al. |
| 5,408,967 A | 4/1995 | Foster |
| 5,470,395 A | 11/1995 | Yater et al. |
| 5,488,231 A | 1/1996 | Kwon et al. |
| 5,525,041 A | 6/1996 | Deak |
| 5,587,827 A | 12/1996 | Hakimi et al. |
| 5,593,509 A | 1/1997 | Zuppero et al. |
| 5,632,870 A | 5/1997 | Kucherov |
| 5,641,585 A | 6/1997 | Lessing et al. |
| 5,651,838 A | 7/1997 | Fraas et al. |
| 5,674,698 A | 10/1997 | Zarling et al. |
| 5,698,397 A | 12/1997 | Zarling et al. |
| 5,736,410 A | 4/1998 | Zarling et al. |
| 5,740,192 A | 4/1998 | Hatano et al. |
| 5,757,833 A | 5/1998 | Arakawa et al. |
| 5,763,189 A | 6/1998 | Buechler et al. |
| 5,780,727 A | 7/1998 | Gimzewski et al. |
| 5,891,656 A | 4/1999 | Zarling et al. |
| 5,917,195 A | 6/1999 | Brown |
| 5,932,885 A | 8/1999 | DeBellis et al. |
| 5,955,772 A | 9/1999 | Shakouri et al. |
| 5,999,547 A | 12/1999 | Schneider et al. |
| 6,067,309 A | 5/2000 | Onomura et al. |
| 6,084,173 A | 7/2000 | DiMatteo |
| 6,114,620 A | 9/2000 | Zuppero et al. |
| 6,119,651 A | 9/2000 | Anderson |
| 6,159,686 A | 12/2000 | Kardos et al. |
| 6,172,427 B1 | 1/2001 | Shinohara et al. |
| 6,218,608 B1 | 4/2001 | Zuppero et al. |
| 6,222,116 B1 | 4/2001 | Zuppero et al. |
| 6,232,546 B1 | 5/2001 | DiMatteo et al. |
| 6,238,931 B1 | 5/2001 | Buechler et al. |
| 6,251,687 B1 | 6/2001 | Buechler et al. |
| 6,268,560 B1 | 7/2001 | Zuppero et al. |
| 6,312,914 B1 | 11/2001 | Kardos et al. |
| 6,323,414 B1 | 11/2001 | Shakouri et al. |
| 6,327,859 B1 | 12/2001 | Zuppero et al. |
| 6,396,191 B1 | 5/2002 | Hagelstein et al. |
| 6,399,397 B1 | 6/2002 | Zarling et al. |
| 6,403,874 B1 | 6/2002 | Shakouri et al. |
| 6,444,476 B1 | 9/2002 | Morgan |
| 6,537,829 B1 | 3/2003 | Zarling et al. |
| 6,649,823 B2 | 11/2003 | Zuppero et al. |
| 6,678,305 B1 | 1/2004 | Zuppero et al. |
| 6,700,056 B2 | 3/2004 | Zuppero et al. |
| 6,903,433 B1 | 6/2005 | McFarland et al. |
| 6,916,451 B1 | 7/2005 | Zuppero et al. |
| 6,944,202 B2 | 9/2005 | Zuppero et al. |
| 7,057,213 B2 | 6/2006 | McFarland et al. |
| 7,109,408 B2 | 9/2006 | Kucherov et al. |
| 7,119,272 B2 | 10/2006 | Zuppero et al. |
| 7,122,735 B2 | 10/2006 | Zuppero et al. |
| 7,208,767 B2 | 4/2007 | Zuppero et al. |
| 7,223,914 B2 | 5/2007 | Zuppero et al. |
| 7,371,962 B2 | 5/2008 | Zuppero et al. |
| 2001/0018923 A1 | 9/2001 | Zuppero et al. |
| 2002/0017827 A1 | 2/2002 | Zuppero et al. |
| 2002/0030729 A1 | 3/2002 | Sako et al. |
| 2002/0045190 A1 | 4/2002 | Wilson et al. |
| 2002/0070632 A1 | 6/2002 | Zuppero et al. |
| 2002/0121088 A1 | 9/2002 | Zuppero et al. |
| 2002/0123592 A1 | 9/2002 | Zhang et al. |
| 2002/0196825 A1 | 12/2002 | Zuppero et al. |
| 2003/0000570 A1 | 1/2003 | Zuppero et al. |
| 2003/0019517 A1 | 1/2003 | McFarland |
| 2003/0030067 A1 | 2/2003 | Chen |
| 2003/0100119 A1 | 5/2003 | Weinberg et al. |
| 2003/0166307 A1 | 9/2003 | Zuppero et al. |
| 2003/0207331 A1 | 11/2003 | Wilson et al. |
| 2004/0182431 A1 | 9/2004 | Zuppero et al. |
| 2005/0189011 A1 | 9/2005 | Zuppero et al. |
| 2006/0002844 A1 | 1/2006 | Suenaga et al. |
| 2007/0163874 A1 | 7/2007 | Zuppero et al. |
| 2008/0206964 A1* | 8/2008 | Tombler ................ B82Y 10/00 438/466 |

FOREIGN PATENT DOCUMENTS

| | | |
|---|---|---|
| JP | 2264101 A | 10/1990 |
| NL | 1065463 | 4/1967 |
| WO | WO-0072384 A1 | 11/2000 |
| WO | WO-0128677 A1 | 4/2001 |
| WO | WO-0129938 A1 | 4/2001 |
| WO | WO-0154171 A1 | 7/2001 |
| WO | WO-02/058219 A2 | 7/2002 |
| WO | WO-2007/061945 A2 | 5/2007 |
| WO | WO-2010/048405 A1 | 4/2010 |

OTHER PUBLICATIONS

Aeschlimann, M. et al., Competing nonradiative channels for hot electron induced surface photochemistry, Chemical Physics, Apr. 15, 1996, pp. 127-141, vol. 205, Issue: 1-2.

(56) References Cited

OTHER PUBLICATIONS

Agranovich, V.M. et al., "New concept for organic LEDs: non-radiactive electronic energy transfers from semiconductor quantum well to organic overlayer", Elsevier Science, Synthetic Metals, 2001, vol. 116, pp. 349-351.
Albano, Ev, et al.; Adsorption-Kinetics of Hot Dimers, SciSearch Database of the Institute for Scientific Information (1999).
Altukhov, I.V. et al., Towards Sil-xGen quantum-well resonant-state terahertz laser, Applied Physics Letters, vol. 79, No. 34 (2001).
Anastassakis, E.M. et al., The Physics of Semiconductors, vol. 2, World Scientific (1990).
Armour, P. et al. "Hot-electron transmission through metal-metal interfaces: a Study of Au/Fe/Autrilayers in GaAs substrates", Applied Surface Science 123/124 (1998), pp. 412-417.
Auerbach, Daniel J. et al., "Reagent Vibrational Excitation: A Key to Understanding Chemical Dynamics at Surfaces?", abstract only.
Auerbach, Daniel J., "Hitting the Surface-Softly"; Science 294 (2001). pp. 2488-2489.
Avouris, P. et al., "Electron-Stimulated Catalysis Device", IBM Technical Disclosure Bulletin, vol. 25, No. 12 May 1, 1983, pp. 6378-6379. New York, US, XP002219954.
Badescu, S.C. et al., Energetics and Vibrational States for Hydrogen on Pt(111), Physical Review Letters, vol. 88, No. 13 (2002).
Balandin, A. et al., Effect of phonon confinement on the thermoelectric figure of merit of quantum wells, Journal of Applied Physics, Dec. 1, 1998, vol. 84, Issue 11 pp. 6149-6153.
Balandin, A. et al., Significant decrease of the lattice thermal conductivity due to phonon confinement in a free-standing semiconductor quantum well, Physical Review B, Jul. 15, 1998; vol. 58, Issue 3, pp. 1545-1549.
Bartels, A. et al. Coherent Zone-Folded Longitudinal Acoustic Phonons in Semiconductor Superlattices: Excitation and Detention, Physical Review Letters, vol. 82, No. 5 (1999).
Baumgren, J.J. et al., Ultrafast Acoustic Phonon Ballistics in Semiconductor Heterostructures, Physical Review Letters, vol. 78, No. 17 (1997).
Bedurftig, K. et al., Vibrational and structural properties of OH adsorbed on Pt (111), Jorunal of Chemical Physics, vol. 111, No. 24 (1999).
Benson, "Sodium chemiluminescence in the Na+N2O and Na-catalyzed N2O+CO Reactions," Sep. 1976, pp. 3879-3885.
Bezant, C.D. et al., Intersubband relaxation lifetimes in p-GaAs/AJGaAs quantum wells below the LO-phonon energy measured in a free elctron laser experiment, Semicon. Sci. Technol., 14 No. 8 (1999).
Bondzie, V.A. et al., Oxygen adsorption on well-defined gold particles on Ti02(110), Journal of Vacuum Sciences & Technology A: Vacuum, Surfaces and Films, vol. 17, Issue 4, pp. 1717-1720 (1999).
Bonn, M. et al., "Phono-Versus Electron-Mediated Desorption and Oxidation of CO on Ru(0001)," Science, vol. 285, No. 5430, Issue of Aug. 13, 1999, pp. 1042-1045.
Boulter, James; Laboratory Measurement of OH (X2 Di; O; U 4) Collisional Deactivation by Oxygen Atoms: http://pearll.lan.gov/WSA2002talks.pdf.
Brako, R. et al., Interaction of CO molecules adsorbed on metal surfaces, Vacuum 61, 89-93 (2001).
Bürgi, L. et al., Confinement of Surfaces State Electrons in Fabry-Pérot Resonators, Physical Review Letters, vol. 81, No. 24 (1998).
Bürgi, L. et al., Probing Hot-Electro Dynamics at Surfaces with a Cold Scanning Tunnelling Microscope, Physical Review Letters, vol. 82 (No. 22) (1999).
Campillo, I. et al. "Inelastic Lifetimes of Hot Electrons in Real Metals", Physical Review Letters, vol. 83, No. 11, Sep. 13, 1999, pp. 2230-2233.
Casassa, M.P. et al., Time-resolved measurements of vibrational relaxation of molecules on surfaces: Hydroxyl groups on silica surfaces, Journal of Vacuum Science and Technology A: Vacuum, Surfaces and Films, vol. 3, Issue 3 (1985).
Cavanagh, R.R. et al., Vibrational relaxation of adsorbed molecules: Comparison with relaxation rates of model compunds, Journal of Vacuum Science & Technology A: Vacuum, Surfaces and Films, vol. 5, Issue 4 (1987).
Chang, Y.M. et al., Observation of local-interfacial optical phonons at buried interfaces using time-resolved second harmonic generation, physical Review B, vol. 59, No. 19 (1999).
Chang, Y.M. et al., Coherent phonon spectroscopy of GaAs surfaces using time-resolved second-harmonic generation, Chemical Physics 251, 283-308 (2000).
Chang, Y.M. et al., Observation of Coherent Surface Optical Phonon Oscillations by Time-Resolved Surface Second-Harmonic Generation, Physical Review Letters, vol. 78, No. 24 (1997).
Chang, Y.M., Interaction of electron and hole plasma with coherent longitudinal optical phonons in GaAs, Applied Physics Letter, vol. 80, No. 14 (2002).
Chen, J. et al., Stimulated-emission-induced enhancement of the decay rate of longitudinal optical phonons in III-V semiconductors: Applied Physics Letters, vol. 80, No. 16 (2002).
Chen, C. et al., "Hot electron reduction at n-Si/Au think film electrodes", Journal-of-the Electrochemical Society, vol. 139, Nov. 1992, pp. 3243-3249.
Chinag, T.C., "Photoemission studies of quantum well states in thin films", Surface Science Reports 39 (2000) pp. 181-235.
Choi, C.K. et al., "Ultrafast carrier dynamics in a highly excited GaN epilayer", Physical Review B, vol. 63, 115315, Mar. 15, 2001, 6 pages.
Chubb, D.L., et al., "Semiconductor Silicon as a Selective Emitter"; http://www.thermopv.org/TPV 5-2-05-Chubb.pdf (abstract only).
Corcelli, S.A. et al., Vibrational energy pooling in CO on NaCl (100): Methods, Journal of Chemical Physics, vol. 116, No. 18 (2002).
Cummings, M.D. et al., Ultrafast impulsive excitation of coherent longitudinal acoustic phonon oscillations in highly photoexcited InSb, Applied Physics letters, vol. 79, No. 6 (2001).
Danese, A., et al., "Influence of the substrate electronic structure on metallic quantum well state dispersions in ultrathin metal films", Prog. Surf. Sci., 67, (2001), pp. 249-258.
Davis, J.E. et al., Kinetics and dynamics of the dissociative chemisorption of oxygen Chem. Phys., 107 No. 3, Jul. 15, 1997, pp. 943-951.
Debernardi, A. et al., "Anharmonic Phonon Lifetimes in Semiconductors from Density-Functional Perturbation Theory", Physical Review Letters, vol. 75, No. 9, Aug. 28, 1995, pp. 1819-1822.
Dekorsy, T. et al., Coherent Acoustic Phonons in Semiconductor Superlattics, phys. Stat. sp: (bA) 215, p. 425-430 (1999).
Del Fatti, N. et al., "Temperature-dependent electron-lattice thermalization in GaAs" Physical Review B, Feb. 15, 1999-1, vol. a59, No. 7, pp. 4576-4579.
Demidenko, A.A. et al., Amplification of localized acoustic waves by the electron drift in a quantum well, Semiconductor Physics, Quantum Electronics & Optoeletronics, vol. 2, No. 1 pp. 11-24 (1994).
Demidenko, A.A. et al., Generation of coherent confined acoustic phonons by drifting electrons in quantum wire: Semiconductor Physics, Quantum Electronics & Optoelectronics, vol. 3, No. 4, pp. 432-437 (2000).
Demidenko, A.A. et al., Piezoelectrically active acoustic waves confined in a quantum well and their amplifications by electron drift, Semiconductor Physics, Quantum Electronics & Optoelectronis, vol. 3, No. 4, pp. 427-431 (2000).
Denzler, D.N. et al., Surface Femtochemistry: Ultrafast Reaction Dynamics Driven by Hot Electron Mediated Reaction Pathways, World Scientific (2001).
DePaula, A.M. et al., Carrier capture via confined phonons in GaAs—A1GaAS multiple quantum wells, Selcond. Sci. Technol. 9, pp. 730-732 (1994).
DePaula, et al., Electron Transfer Times in Type-11 Superlattices Due to Emission of Confined Phonons, Appl. Phys. Lett 65 (10) (1994).
DePaula, A.M. et al., "Carrier capture processes in semiconductor superlattices due to emission of confined phonons", Appl. Phys. 77 (12) 1995 pp. 6306-6312.

(56) References Cited

OTHER PUBLICATIONS

Diekhoner, L. et al, Parallel pathways in menthol decomposition on Pt (111), Surface Science 409, pp. 384-391 (1998).
Diesing, D. et al., "Aluminium oxide tunnel junctions: influence of preparation technique, sample geometry and oxide thickness", Thin Solid Films, 342 (1999), pp. 282-290, accepted Sep. 11, 1998.
Diesing, D. et al., "Surface reactions with hot electrons and hot holes in metals", Surface Science, 331-333, 1995, pp. 289-293.
DiMatteo, R.S. et al., Enhanced photogeneration of carriers in a semiconductor via coupling across a nonisothermal nanoscale vacuum gap, Applied Physics Letters, vol. 79, Issue 12 (2001).
DiMatteo, R.S. et al., "Introduction to and Experimental Demonstration of Micron-gap Thermo Photo Voltaics"; http://thermopv.org/37DiMatteo.html (abstract only).
Dogwiler, Urs, et al., "Two-dimensional modeling for catalytically stabilized combustion of a lean methane-air-mixture with elementary homogeneous and heterogeneous chemical reactions", Combustion and Frame (1999), 116 (1,2), pp. 243-258.
Driskill-Smith, A.A.G. et al., "The 'nanotriode'; A nonoscale field-emission tube", Applied Physics Letters, Nov. 1, 1999, vol. 75, Issue 18, pp. 2845-2847.
Echenique, P.M. et al., "Surface-state electron dynamics in noble metals"; Prog. Surf. Sci., 67, (2001), pp. 271-282.
Endo, Makoto, et al., Oxidation of methanol by molecularly absorbed oxygen on Pt (111) under vacuum and ambient pressure conditions studied by infrared reflection absorption spectroscopy: identification of formate intrmedicate; Surf. Sci 441 (1999) L931-L937, Surf. Sci Letters.
Engstrom, Ulrika and Ryberg, Roger, "Comparing the vibrational properties of low-energy modes of a molecular and an atomic absorbate: CO and O on Pt. (111)," Journal of Chemical Physics, vol. 112, No. 4, Jan. 22, 2000, pp. 1959-1965.
Ermoshin, V.A. et al., Vibrational energy relaxation of absorvate vibrations: A theoretical study of the H/Sj (111) system, J. Chem. Phys. 105 (20) (1996).
Fan, G.Y. et al., "The oxidation of CO on Ru02 at room temperature"; J. Chem. Phys. 114, (2001) pp. 10058-10062.
Fan, Xiaofeng, Zeng, LaBounty, Chris, and Bowers, John E., Croke, Edward, Ahn, Channing C., Huttable, Scott, Majumdar, Arun, Shakourj, Ali; SiGeC/Si Superlattice microcoolers; Applied Physics Letters, vol. 78, No. 11, Mar. 12, 2001, pp. 1580-1582.
Fann, W.S. et al., Electron thermalization in gold, Physical Review B, Brief Reports, vol. 46, No. 20 (1992).
Fatti et al., Temperature-Dependent Electron-lattice Thermalization in GaAs, Physical Review B, vol. 59, No. 7 (1999).
Fierz, M. et al., Time-resolved 2-Photon Photoionization on Metallic Nanoparticles, Appl. Phys. B 68 (1999); http://llp.physik.uni-essen.de/aeschlimann/abstract.htm#6.
Frese, Karl W. et al., "Analysis of Current/Voltage Curves at n-Si/SiO2/Pt Electrodes", J. Electrochem Soc., Dec. 1994, pp. 3375-3382, vol. 141, No. 12, The Elctrochemical Society, Inc.
Frese, K.W. et al., "Hot Electron Reduction at Etched n-Si/Pt Thin Film Electrodes", Electrochem. Soc., Sep. 1994, pp. 2402-2409, vol. 103, The Electrochemical Society Inc.
Frese, et al., "Methanol Oxidation at p-Si/Pi Electrodes, Evidence for Hot Hole Reactivity", J. Phys. Chem., 1995, pp. 6074-6083, vol. 99, American Chemical Society.
Friedmann, L. et al., SiGe/Si THz laser based on transitions between inverted mass light-hole and heavy-hold subbands, Applied Physics Letters, vol. 78, No. 4 (2001).
Funk, S. et al., "Desorption of CO from Ru-001-induced by near-infrared fetosecond laser pulses", Journal of Chemical Physics, vol. 112, No. 22, Jun. 8 200, pp. 9888-9897.
Gadzuk, J.W., "Hot-electron femtochemistry at surfaces: on the role of multiple electron processes in desorption," Chemical Physics, vol. 251, Year 2000, pp. 87-97.
Gadzuk, J.W., "Multiple Electron Processes in Hot-Electron Femtochemistry at Surfaces", http://cstl.nist.gov/div837/837.03/highlite/gadzuk 1999.htm.

Gadzuk, J.W., "Resonance-Assisted Hot Electron Femtochemistry at Surfaces", Physical Review Letters, May 27, 1996, vol. 76, Issue 22, pp. 4234-4237.
Gadzuk, J.W., "Surface Femtochemistry with Fast Lasers and Slow Nonostructures", http://cstl.nist.gov/div837/837.03/highlife/previous/dietmin.htm (Date Unknown).
Gaillard, Frederick et al., Hot Electron Generation in Aqueous Solution at Oxide-Covered Tantalum Electrodes. Reduction of Methylpyridinium and Electrogenerated Chemiluminescence of Ru (bpy) 32 +, Journal of Physical Chemistry B., vol. 103, No. 4, Jan. 28, 1999, pp. 667-674.
Gao, Shiwu, "Quantum kinetic theory of vibrational heating and bond breaking by hot electrons," Physical Review B, vol. 55, No. 3, Jan. 15, 1997-I, pp. 1876-1886.
Ge, N.H. et al, "Femiosecond Dynamics of Electron Localization at Interfaces," Science, vol. 279, No. 5348 AIssue of Jan. 9, 1998, pp. 202-205.
Gee, Adam T. et al., "The dynamics of 02 adsorption of Pt(553): Step mediated molecular chemisorption of Pt(533): Step mediated molecular chemisorption and dissociation", J. Chem. Phys. (2000) 113, pp. 10333-10343.
Gergen, B. et al. "Chemically Induced Electronic Excitations at Metal Surfaces," Science, vol. 294, No. 5551, Issue of Dec. 21, 2001, pp. 2521-2523.
Glavin, B.A. et al., Acoustic Phonon Generation in a Superlattice Under the Hopping Perpendicular Transport, United Nationals Educational Scientific and Cultural Organization and International Atomic Energy Agency (1998).
Glavin, B.A. et al., Generation of high-frequency coherent acoustic phonons in a weekly coupled superlattice, Applied Physics Letters, vol. 74, No. 23 (1999).
Guliants, ElenaA, et al., ; "A 0.5um-thick polycrstalline silicone Schottky diode with rectification ratio of 106"; Appl. Phys. Let., (2002), 80, pp. 1474-1476.
Gumhalter, B. et al., "Effect of electronic relaxation on covalent adsorption reaction rates"; Phys. Rev. B (1984) 30 pp. 3179-3190.
Guo, Jingyan et al., The desorption yield dependence on wavelength of femtosecond laser from CO/CU(111), Annual Meeting of the American Physical Society, Mar. 1999, Atlanta, GA; Session BC-18— Surfaces (General), ORAL session, Mar. 21; Room 258W, GWCC (BC18.06.
Hagston, W.E. et al., Simplified treatment of scattering processes in quantum well structures, Journal of Applied Physics, vol. 90, No. 3 (2001).
Halonen, Lauri, et al., : "Reactivity of vibrationally excited methane on nickel surfaces", J. Chem. Phys. (2001) 115, pp. 5611-5619.
Harrison, P. et al., Maximizing the population inversion, by optimizing the depopulation rate, in far-infrared quantum cascade lasers (2001).
Harrison, P. et al., Population-inversion and gain estimates for a semiconductor TASER.
Harrison, P. et al., Room temperature population inversion in SlGe TASER designs, IMP, School of Electronics and Electrical Engineering. The University of Leeds.
Harrison, P. et al., The carrier dynamics of terahertz intersubband lasers, Some Publishing Company (1999).
Harrison, P. et al., Theoreticl studies of subband carrier lifetimes in an optically pumped three-level terahertz laser, superlattices and microstructures, vol. 23, No. 2 (1998).
Harrison, P. et al., The carrier dynamics of far-infrared intersubband lasers and tunable emitters, Institute of Microwaves and Photonics, University of Leeds, U.K., pp. 1-64.
Hasegawa, Y. et al., Modification of electron density in surface states; standing wave observation on Pd overlayers by STM; Surf. Sci., in press, Apr. 11, 2002.
Henry, Claude R.; Catalytic activity of supported nanometer-sized metal clusters; Applied Surf., Sci., 164 (2000) pp. 252-259.
Hess, S. et al., "Hot Carrier Relaxation by Extreme Electron-LO Phonon Scattering in GaN", http://www.physics.ox.ac.uk/rtaylor/images/hot%20carrier%20poster.pdf (Date Unknown).
Ho, Wilson; http://lassp.cornell.edu/lassp data/wilsonho.html.
Hofer, U. "Enhanced Self-Trapping of Electrons at Surfaces", Science, vol. 279, No. 5348, Issue of Jan. 9, 1998, pp. 190-191.

(56) References Cited

OTHER PUBLICATIONS

Hohlfeld, J. et al., Electron and lattice dynamics following optical excitation of metals, Chemical Physics 251, pp. 237-258 (2000).

Honkala, Karoliina et al.; "Ab initio study of 02 precursor states on the Pd(111)surface", J. Chem. Phys. (2001) 115, pp. 2297-2302.

Hou, H. et al., "Enhanced Reactivity of Highly Vibrationally Excited Molecules on Metal Surfaces," Science, vol. 284, No. 5420, Issue of Jun. 4, 1999, pp. 1647-1650.

Hou, H. et al.; "Chemical Interactions of Super-Excited Molecules on Metal Surfaces"; http://2.chem.ucsb.ed/wodtke/papers/danl.pdf.

Hou, H., et al.; "Direct Imultiquantum relaxation of highly vibrationally excited NO in collisions with O/Cu(111)", J. Chem. Phys., 110, (1999) pp. 10660-10663.

Huang, Y. et al., Observation of Vibrational Excitation and Deexcitation for NO(v=2) Scattering from Au(111): Evidence of Electron-Hole-Pair Mediated Energy Transfer. Physical Review Letters, vol. 84, No. 13 (2000).

Huang, Yuhui, et al., "Vibrational Promotion of Electron Transfer"; Science, vol. 290, Oct. 6, 2000, pp. 111-113.

Hyh, Chan et al., Methanol Oxidation of Palladium Compared to Rhodium at Ambient Pressures as Probed by Surface-Enhanced Raman and Mass Spectroscopies, Journal of Catalysis, vol. 174 (2) (1998).

IBH: "Red picosecond laser sources"; http://www.ibh.co.uk/products/light_sources/nanoled/heads/red_laserheads.htm.

IBH; "NanoLed Overview"; http://ibh.co.uk/products/light_sources/light_sources/nanoled_main.htm.

Iftimia, Ileana et al., "Theory of mixed classical-quantum scattering of molecules from surface"; Phys. Rev. B (2002) 65, Article 125401.

Ishikawa, Yasuyuji et al., "Energetics of H2O dissociation of COads+OHads reaction on a series of Pt-M mixed metal clusters: a relativistic density-functional study"; Surf. Sci. preprints SUSC 12830 Apr. 2002.

Johnson, R. Colin; "Molecular substitution produces terhertz switch arrays"; EE Times, (Apr. 10, 2000, 3:35p.m. EST) http://www.eet.com/story/OEG20000410S0057.

Jongma et al., Fast multiquantum vibrational relaxation of highly vibrationally excited 02; Journal of Chemical Physics; vol. 111, No. 24; Dec. 22, 1999; pp. 10957-10963.

Kao, Chia-Ling, et al., "The adsorption dynamics of molecular carbon dioxide on Pt(111) and Pd(111)", Surf Sci., (2001) Article 12570.

Katz, G. et al., "A theoretical study of hole induced desorption", Journal of Chemical Physics, Oct. 22, 1999, vol. 111, Issue 16, pp. 7593-7598.

Katz, Gil et al., Non-adiabatic charge transfer process of oxygen on metal surfaces: Surf. Sci. 425 (1) (1999) pp. 1-14.

Kawakami et al., Quantum-well states in cooper thin films; Letters to nature; vol. 398; Mar. 11, 1999, www.nature.com.

Kim, M.S. et al., "Reaction of Gas-Phase Atomic Hydrogen with Chemisorbed Hydrogen Atoms on an Iron Surface," Bull. Korean Chem. Soc., vol. 18, No. 9, pp. 985-994, May 22, 1997.

Kohler, B. et al., Enhanced Electron-phonon coupling at the Mo and W (110) surfaces induced by absorbed hydrogen, mtrl-th/9510004 (1995).

Komeda, T. et al., "Lateral Hopping of Molecules Induced by Excitation of Internal Vibration Mode", Science, 295, (2002) pp. 2055-2058.

Komirenko, Sergly M., Phonons and Phonon-Related Effects in Prospective Nanoscale Semiconductor Devices (2000).

Krauss, Todd D. et al., Coherent Acoustic Phonons in a Semiconductor Quantum Dot, Physical Review Letters, vol. 79 (No. 25) 1997.

Lee, B.C. et al., "Transmission of longitudinal optical phonons through a barrier in uniaxial crystals", Physical Review B, vol. 65, 153315, Apr. 15, 2002.

Lewis, et al., Substrate-Adsorbate Coupling in Co-Adsorbed Copper, Physical Review Letters, vol. 77, No. 26 (1996).

Lewis S.P. et al., Continuum elastic theory of adsorbate vibrational relaxation, J. Chem. Phys. 108 (3) (1998).

Lewis, S.P. et al., Controlling adsorbate vibrational lifetimes using superlattices, physical Review B, vol. 63, 085402 (2001).

Lewis, S.P. et al., Vibrational Dynamics of Molecular Overlayers on Metal Surfaces, Dept. of Chemistry, University of Pennsylvania, http://lorax.chem.upenn.edu/molsurf/cucotalk.html.com.

Li, Shenping et al., "Generation of wavelength-tunable single-mode picosecond pulses from a self-seeded gain-switched Fabry-Perot laser diode with a high-birefringence fiber loop mirror", Appl. Phys. Let. 76 (2000) pp. 3676-3678.

Luglit, P. et al., Interaction of electrons with interface phonons in GaAs/AlAs and GaAs/AlGAs heterostructures, Semicond. Sci. Technol. 7 (1992).

Mahan, G.D. et al., "Multilayer thermionic refrigerator and generator," Journal of Applied Physics, vol. 83, No. 9, May 1, 1998.

McCabe, R.W., et al., Kinetics and Reaction Pathways of Methanol Oxidation on Platinum; J.Phys. Chem. 1986, 90, pp. 1428-1435.

Mitsui, T. et al.; "Coadsorption and interactions of O and H on Pd(111)"; Surf.Sci., Article 12767, (2002).

Moula, Md. Golam et al., "Velocity distribution of desorbing CO2 in CO oxidation on Pd(110) under steady-state conditions"; Applied Surf. Sci. 169-170, pp. 268-272 (2001).

Mulet, Jean-Philippe et al., Nanoscale radiative heat transfer between a small particle and a plane surface, Applied Physics Letters, vol. 78, No. 19 (2001).

Murphy, M.J. et al., "Inverted vibrational distrutions from N2 recombination at Ru(001): Evidence for a metastable molecular chemisorption well" Journal of Chemical Physics, vol. 110, No. 14, pp. 6954-6962, Apr. 8, 1999.

NANOLITE, "NANOLITE Sparkflashlamp", http://www. hsps.com/products/nanolaen.htm (Date Unkown).

Nienhaus, H. et al., Direct detection of electron-hole pairs generated by chemical reactions on metal surfaces, Surface Science 445, pp. 335-342 (2000).

Nienhaus, H. et al., "Electron-Hole Pair Creation at Ag and Cu Surfaces by Adsorption of Atomic Hydrogen and Deuterium," Physical Review Letters, vol. 82, Issue 2, Jan. 11, 1999, pp. 446-449.

Nienhaus, H. et al., "Selective H atom sensors using Ultrathin Ag/Si Schottky diodes," Applied Physics Letter, Jun. 28, 1999, vol. 74, Issue 26, pp. 4046-4048.

Nienhaus, Hermann, Electronic excitations by chemical reactions on metal surfaces, Surfaces Science Reports 45, pp. 1-78 (2002).

Nolan, P.D. et al., "Direct verification of high-translational-energy molecular precursor to oxygen dissociation on Pd (111)," Surface Science vol. 419, pp. L107-L113, Dec. 24, 1998.

Nolan, P.D. et al., Molecularly chemisorbed intermediates to oxygen adsorption on Pt (111): A molecular beam and electron energy-loss spectroscopy study, Journal of Chemical Physics, vol. 111, No. 8, pp. 3696-3704.

Nolan, P.D. et al., "Translational Energy Selection of Molecular Precursors to Oxygen Adsorption on Pt. (111)," Physical Review Letters, vol. 81, No. 15, pp. 3179-3182, Oct. 12, 1998.

Ogawa, S. et al., Optical Intersubband Transitions and Femtosecond Dynamics in Ag/Fe (100) Quantum Wells, Physical Review Letters, vol. 88, No. 11 (2002).

Otto, Andreas et al., "Role of Atomic Scale Roughness in Hot Electron Chemistry," Journal of Physical Chemistry B, vol. 103, No. 14, Apr. 8, 1999, pp. 2696-2701.

Ozgür, Ümit et al., Control of Coherent Acoustic-Phonons in InGaN Multiple Quantum Wells, arXiv:cond-mat/0010170 (2000).

Paggel, J.J. et al., Quantum well photoemission from atomically uniform Ag filmes: determination of electronic band structure and quasi-particle lifetime in Ag(100) Applied Surface Science 162-163, pp. 78-85 (2000).

Paggel, J.J. et al., "Quantum-Well States as Fabry-Pérot Modes in a Thin-Film Electron Interferometer": Science, 283, (1999), pp. 1709-1711.

Paggel, J.J. et al., "Quasiparticle Lifetime in Macroscopically Uniform Ag/Fe(100) Quantum Wells", Phys. Rev. Letter (1998) 81, pp. 5632-5635.

Park, Hongkun et al., "Nanomechanical ascillations in a single-C60 transistor", Letters to Nature, vol. 407, Sep. 7, 2000, www.nature.com, pp. 57-60.

(56) References Cited

OTHER PUBLICATIONS

Persson, M. et al., A first-principles potential energy surface for Eley-Rideal reaction dynamics of H atoms on Cu(111), Journal of Chemical Physics, vol. 110, No. 4 (1999).
Phihal, M. et al., "Role of intra-adsorbate Coulomb correlations in energy transfer at metal surfaces", Physical Review B, Jul. 15, 1998, vol. 58, Issue 4, pp. 2191-2206.
Pontius, N. et al., "Size-dependent hot-electron dynamics in small Pdn clusters", Journal of Chemical Physics, Dec. 8, 2001, vol. 115, Issue 22, pp. 10479-10483.
Prabhu, S.S. et al., Femtosecond energy relaxation of nonthermal electrons injected in p-doped GaAs base of a heterojunction bipolar transistor, Journal of Applied Physics, vol. 90, No. 1 (2001).
Prieur et al., "Sound Ampl;ification by Stimulated Emission of Radiation in an Amorphous Compund," Europhysics Letters, 24 (5) (1993), pp. 409-414.
Prybyla, J.A. et al., Femtosecond Time-Resoved Surface Reaction: Desorption of CO from Cu (111) in 325 fsec;, Physical Review Letters, Jan. 27, 1992, vol. 68, Issue 4, pp. 503-506.
Qiu, T. et al., Long-distance propagation and damping of low-frequency phonon polaritions in LiNb03, Physical Review B, vol. 56, No. 10 (1997).
Qu, J. et al., Long-lived phonons, Physical Review B, vol. 48, No. 9 (1993).
Ree, J., et al., "Dynamics of Gas-Surface Interactions: Reaction of Atomic Oxygen with Chemisorbed Hydrogen on Tungsten", Journal of Physical Chemistry, vol. 101 (#25), pp. 4523-4534, Jun. 19, 1997.
Ree, J. et al., "Reaction of atomic oxygen with adsorbed carbon monoxide on a platinum surface," Journal of Chemical Physics, vol. 104, Issue 2, pp. 742-757, Jan. 8, 1996.
Rettner, C.T., et al., Dynamics of the chemisorption of 2 on Pt(111): Dissociation via direct population of a molecularly chemisorbed precursor at high incidence kinetic energy, The Journal of Chemical Physics, vol. 94, Issue 2 (1991).
Rinnemo, Mats; "A Study of Catalytic Ignition and Kinetic Phase Transitions"; 1996; http://www.2.llb.chalmers.se/cth/diss/doc/9596/RinnemoMats.html.
Robertson, A.J.B.; et al., "Catalysis of Gas Reactions by Metals"; Logos Press Limited; 1970; LC #70-80936; pp. 1-5, 10, 41 Great Britain, Adlard & Son Ltd.
Rousse, a. et al., Non-thermal melting in semiconductors measured at femtosecond resolution, Nature, vol. 410 (2001).
Saalfrank, P. et al., "Quantum dynamics of bond breaking in a dissipative environment; Indirect and direct photodesorption of neutrals from mets", Chem. Ohy. 105 (6), Aug. 8, 1996, pp. 2441-2454.
Schelling, P.K. et al., Phonon wave-packet dynamics at semiconductor interfaces by molecular-dynamics simulation, Applied Physics Letters, vol. 80, No. 14 (2002).
Schewe, P. et al., "CO2 Production at the Single-Molecule Level"; http://www.aip.org/enews/physnews/2001/split/561-1.html.
Schonnhammer et al., "Energy Dissipation at Metal Surfaces: Electronic Versus Vibrational Excitations," Journal of Electron Spectroscopy and Related Phenomena (1983), pp. 91-103.
Sheng, H. et al., "Schottky diode with Ag on (1120) epitaxial ZnO film"; Appl. Phys. Let. (2002) 80, pp. 2132-2134.
Shikin, A.M. et al., Phase accumulation model analysis of quantum well resonances formed in ultra-thin Ag, Au filmes on W(110), Surface Science (2001).
Shin, H.K. et al., "Vibrationally Excited OD Radicals From the Reaction of Oxygen-Atoms with Chemisorbed Deuterium on Tungsten," Journal of Physical Chemistry, vol. 102 (#13), pp. 2372-2380, Mar. 26, 1998.
Smit, G.D.J., Enhanced tunneling across nanometer-scale metal-semiconductor interfaces; Appl. Phys. Let (2002) 80, pp. 2568-2570.
Snow, E.S. et al., Ultrathin PiSi layers patterned by scanned probe lithography; Appl. Phys. Let. (2001) 79, pp. 1109-1111.

Soref, R.A. et al., Terhertz gain in a SiGe/Si quantum staircase utilizing the heavy-hole inverted effective mass, Applied Physics Letters, vol. 79, No. 22 (2001).
Spetz, Lloyd et al., "High Temperature Sensors Based on Metal-Insulator-Silicon Carbide Devices," Jan. 1997, pp. 493-511.
Stanton, N.M. et al., Energy relaxation by hot electrons in n-GaN epilayers, Journal of Applied Physics, vol. 89, No. 2 (2001).
Steinbrüchel et al., "Energy Dissipation in Catalysis", University of Minnesota, Aug. 1973, pp. 267-270.
Stipe, B.C. et ak., "Atomistic studies of 02 dissociation on Pt (111) induced by photons, electrons, and by heating," Journal of Chem. Phys. , vol. 107 (16), Oct. 22, 1997, pp. 6443-6447.
Stromquist, J. et al., The dynamics of H absorption in and adsorption on Cu (111), Surface Science 397, pp. 382-394 (1998).
Sun, G. et al., Intersubband lasing lifetimes of SiGe/Si and GaAs/AlGaAs multiple quantum well structuress, Applied Physics Letters, vol. 66, No. 25 (1995).
Sun, G. et al., Phonon Pumped SiGe/Si Interminiband Terahertz Laser, pp. 1-11.
Sun, G. et al., Phonon-pumped terahertz gain in n-type GaAs/AlGaAs superlattices, Applied Physics Letters, vol. 78, No. 22 (2001).
Sun, C.K. et al., "Fetosecond studies of carrier dynamics in InGaN"; Applied Phys. Letter (1997) 70 pp. 2004-2006.
Sung, Y.E. et al. "Enhancement of Electrochemical Hot Electron Injection into Electrolyte Solutions at Oxide-Covered Tantalum Eletrodes by Thin Platinum Films", Journal of Physical Chemistry B., vol. 102, No. 49, Dec. 3, 1998 pp. 9806-9811.
Sung, Y.E. et al., "Demonstration of Electrochemical Generation of Solution-Phase Hot Electrons at Oxide-Covered Tantalum Electrodes by Direct Electrogenerated Chemiluminescence", J. Phys. Chem, 1998, pp. 9797-9805, vol. 102, American Chemical Society.
Svensson, K. et al., "Dipole Active Vibrational Motion in the Physisorption Well"; Phys. Rev. Lett., 78 (1997) pp. 2016-2019.
Takaoka, G.H. et al., "Presentation and catalytic activity of nanoscale Au islands supported on Ti02", Nuclear Instruments & Methods in Physics Research, Section—B: Beam interactions with Materials and Atoms, North-Holland Publishing Company, Amsterdam, NL., vol. 121, No. 1, 1997, pp. 503-506, XP904057973, abstract.
Tarver, Craig M.; "Non-Equilibrium Chemical Kinetic Effects in Explosive Reactive Flows"; Fall 1999 IMA Workshop: High-Speed Combustion in Gaseous and Consensed-Phase.
Taylor et al., "Phonon Focusing in Solids," Jun. 1969, pp. 416-420.
Taylor, R.A. et al., Strong Electron-LO Phonon Scattering and Hot Carrier Relaxatin in GaN, Abrast No. ha249KW3 http://uk./rtaylor.images/ha249kw3.pdf.
Teodorescu, C.M. Structure of Fe layers grown on InAs(100); Appl. Surf. Sci., 166, (2000) pp. 137-142.
Tiusan, C. et al., Quantum coherent transport versus diode-like effect in semiconductor-free metal/insulator structure, Applied Physics Letters, vol. 79, No. 25 (2001).
Tobias et al., "Fast chemical Sensing with Metal-Insulator Silicon Carbide Structures," Jun. 1997, pp. 287-289.
Tom, Harry W.K. et al., Coherent Phonon and Electron Spectroscopy on Surfaces Using Time-Resolved Second-Harmonic Generation.
Tripa, C. Emil et al., Surface-aligned photochemistry: aiming reactive oxygen atoms along a single-crystal surface, Journal of Chemical Physics, vol. 112, No. 5 (2000).
Tripa, C. Emil et al., "Kinetics measurements of CO photooxidation on Pt(111)," Journal of Chemical Physics, vol. 105, Issue 4, pp. 1691-1696, Jul. 22, 1996.
Tripa, C. Emil et al., "Surface-aligned reaction of photogenerated oxygen atoms with carbon monoxide targets"; Nature 398, pp. 591-593 (1999).
Tripa, C. Emil et al., "Special Adsorption and Reaction Effects at Step Defect Sites on Platinum . . . "; http://www.chem.pitt.edu/thesis.html#tripa (abstract only).
Tsai, Chin-Yi et al., Theoretical modeling of nonequilibrium optical phonons and electron energy relaxation in GaN, Journal of Applied Physics, vol. 85, No. 3 (1999).

(56) References Cited

OTHER PUBLICATIONS

Tully, John C. et al., Electronic and phonon mechanisms of vibrational relaxation: CO on Cu (100), J. Vac. Sci Technol. A 11(4) (19930.
Ultrafast Surface Dynamics Group, Time-Resolved Two-Phonon Photoemission (TR-2PPE), http://www.llp.physik.uni-essen.de/aeschlimann/2y_photo.htm.
Valden, et al., Onset of Catalytic Activity of Gold Clusters on Titania with the Appearance of Nonmetallic Properties, Science, vol. 281 (1998).
Vale, R.D. et al., "The Way Things Move: Looking Under the Hood of Molecular Motor Proteins", Science, vol. 2888, Apr. 7, 2000, www.sciencemag.org, pp. 88-95.
Volkening, S. et al., "CO oxidation on Pt(111)—Scanning tunneling microscopy experiments and Monte Carlo simulation", Chem. Phys. (2001) 114, pp. 6382-6395.
Wanke, Michael C. et al., Injectorless quantum-cascade lasers, Applied Physics Letters, vol. 78, No. 25 (2001).
Watson, D.T.P. et al., "Isothermal and temperature-programmed oxidation of CH over Pt (110) (1x2)"; Surf. Sci. preprint, year 2001.
Watson, D.T.P. et al., "Surface products of the dissociative adsorption of methan on Pt (110)—(1x2)"; Surf. Sci. prepring, c. Oct. 2001.
Weber, G. Carrier capture processes in GaAs—AlGaAs quantum wells due to emission of confined phonons, Appl. Phys. Letter 63 (22) (1993).
Weber, G. et al., to Xz electron transfer times in Type-11 GaAs/AlAs superlattices due to emission of confined and interface phonons, superlattices and microstructures, vol. 23, No. 2 (1998).
Weinberg, Henry et al., Direct detection of electron-hole pairs generated by chemical reactions on metal surfaces, 2000 Elsevier Science B.V., Surface Science, pp. 335-342.
White, J.M. Using photons and electrons to drive surface chemical reactions, Journal of Molecular Catalysis A: Chemical 131, 1998, pp. 71-90.
Wilke, Steffen et al., "Theoretical investigation of water formation on Rh and Pt Surfaces"; J. Chem. Phys., 112, (2000) pp. 9986-9995.
Wintterlin, J. et al., Atomic and Macroscopic Reaction Rates of a Surface-Catalyzed Reaction, Science, 278 (1997) pp. 1931-1934.
Wintterlin, J. et al., Existence of a "Hot" Atom Mechanism for the Dissociation of 02 on Pt(112), Phys. Rev. Lett., 77, (1996), pp. 123-126.
Witte, Gregor et al., Low frequency vibrational modes of adsorbates, Surface Science, No. 1362 (2002).
Xu, W. et al., Electrical generation of terahertz electromagnetic pulses by hot-electrons in quantum wells, Superlattices and Microstructures, vol. 22, No. 1 (1997).
Yeo, Y.Y. et al., Calorimetric Heats for CO and oxygen adsorptin and for the catalytic CO oxidation reaction on Pt(111). J. Chem. Phys. 106 (1) (1997).
Yeo et al., Calorimetric Investigation of NO and O adsorptin on Pd(100) and the Influence of Preadsorbed Carbon, J. Chem. Phys. 106 (5) (1997).
Zambelli, T. et al., Complex pathways in dissociative adsorption of oxygen on platinum, Nature, vol. 390 (1997).
Zhdanov, V.P. et al., "Substrate-mediated photoinduced chemical reactions on ultrathin metal films", Surface Science, 1999, pp. L599-L603, vol. 432, Elsevier Science B.V.
Zhdanov, V.P. et al., Nm-sized metal particles on a semiconductor surface, Schottky model, etc., Surface Science, SUSC 2931 (2002).
Zhu, X.Y. et al., "Surface photochemistry: from hot reactions to hot materials", Surface Science, vol. 390, (1997), pp. 224-236.
Zhukov, V.P. et al., "Lifetimes of quasiparticle excitations in 4d transition metals: Scattering theory and LMTO-RPA-GW approaches", Phys. Rev. B (2002) 65, Article 115116.
Zavtrok et al., "SASER (Sound Amplification by Stimulated Emission of Radiation)," Apr. 1997, pp. 406-414.
Dittrich, Th. etal., Electrical transport in passivated Pt/Tl02/Tl Schottky diodes, Journal of Applied Physics 98, 104501 (2005).
Fedorovich, R.D. et al., Electron and Light Emission from Island Metal Films and Generation of Hot Electrons in Nanoparticles, Physics Reports 328 (2000), pp. 73-179.
Xiao Z. II, et al., Continuous Hot Electron Generation in Pt/Tl02, Pd/Tl02, and Pt/GaN Catalytic Nanodiodes from Oxidation of Carbon Monoxide, J. Phys. Chem. B 2005, 109, pp. 22530-22535.
Xiaozhong JI, et al., The Catalytic Nanodiode: Gas Phase Catalytic Reaction Generated Electron Flow Using Nanoscale Platinum Titanium Oxide Schottky Diodes, Nano Letters 2005, vol. 5, No. 4, pp. 753-756.
Zhi Liu, et al., Narrow cone emission from negative electron affinity photocathodes, J. Vac. Sci Technol. B 23(6), Nov./Dec. 2005, p. 2758.
Moyzhes B., et al., Thermoelectric figure of merit of metal-semiconductor barrier structure based on energy relaxation length, Applied Physics Letters, vol. 73, No. 13, Sep. 28, 1998.
O'Dwyer, M.F. et al., Electronic efficiency in nanostructured thermionic and thermoelectric devices, Physical Review B 72, 205330 (2005).
O'Dwyer, M.F., et al., Low thermal conductivity short-period superlattice thermionic devices, Journal of Physics D; Applied Physics 39 (2006) pp. 4153-4158.
Papadopoulos, C.A., et al., A new planar device based on Seebeck effect for gas sensing applications, Sensors and Actuators B 34 (1996) 524-527.
Fabin Qiu, et al., Miniaturization of thermoelectric hydrogen sensor prepared on glass substrate with low temperature crystallized 5iGe film, Sensors and Actuators B 103 (2004) pp. 252-259.
Daryoosh Vashaee, et al., Thermionic power generation at high temperatures using 5iGe/Si superlattices, Journal of Applied Physics 101, 053719 (2007).
Kai Zhu, et al., Enhanced Charge-Collection Efficiencies and Light Scattering in Dye Sensitized Solar Cells Using Oriented TiO2 Nanotubes Arrays, Nano Letters 2007, vol. 7, No. 1, pp. 69-74.
Jeong Young Park et al., "Energy Conversion from Catalytic Reaction to Hot Electron Current with Metal-Semiconductor Schottky Nanodiodes" J. Vac. Sci. Technol. vol. 24, No. 4, Jul./Aug. 2006.
Jeong Young Park et al., "The Catalytic Nanodiode: Detecting Continuous Electron Flow at Oxide-Metal Interfaces Generated by a Gas-Phase Exothermic Reaction", Chem PhysChem 2006, 7, 1409-1413.
Xiaozhong Ji, et al. Electron Flow Generated by Gas Phase Exothermic Catalytic Reactions Using a Platinum-Gallium Nitride Nanodiode; Dept. of Chemistry, J.AM Chem. Soc. 2005, 127, 5792-5793.
Pop, E., et al, Thermal Analysis of Ultra-Thin Body Device Sealing; Dept. of Electrical and Mechanical Engineering, Stanford University; IEEE 2003; pp. 66.6.1-366.4.
Braccioll, M., et al. Simulation of self-heating effects in different SOI MOS architectures; Solid-State Electronics 53, 2009 pp. 445-451.
Tenbroek, B., et al, Impact of self-heating and Thermal Coupling on Analog Circuits in SOI CMOS; IEEE Journal of Solid-State Circuits, vol. 33, No. 7, Jul. 1998, pp. 1037, 1046.
Arifuzzaman, M., et al, Investigation of Self-Heating Effects in Individual SOQ Devices and Device-Device Interactions; Arizona State University, Tempe, AZ, p. 269.
Pop, E., et al, Heat Generation and Transport in Nanometer-Scale Transistors; IEEE; vol. 94, No. 8; Aug. 2006; pp. 1587-1601.
Jeong Young Park, et al, "Interfacial and Chemical Properties of Pt/TiO2, Pd/TiO2, and Pt/GaN Catalytic Nanodiodes Influencing Hot Electron Flow", J. Phys. Chem. C. vol. 111, No. 42, pp. 1533-15336, 2007.
Extended European Search Report for EP Application No. 07869983.2; dated Feb. 3, 2012.
Tilak, V., et al, Influence of Metal Thickness to Sensitivity of Pt/GaN Schottky Diodes for Gas Sensing Applications; Materials Research Society, vol. 798 2004.
Okada, H., et al, "Electrical Characteristics and Reliability of Pt/Ti/Pt/Au Ohmic Contacts to p-Type GaAs", Japan J. Appl. Phys. 30, L558-L560 (1991).
Hirsch, M.T., et al, "Correlation of Microstructure with Electrical Behavior of Ti/GaN Schottky Contacts", J. Electron. Mater. 27, 1236-1239 (1998).

(56) References Cited

OTHER PUBLICATIONS

Solarex Corporation, Inc., "The Solarex Guide to Solar Electricity", pp. 66-67, Apr. 1979.
Office Action dated Apr. 30, 2013, U.S. Appl. No. 13/336,529.
Pocius, Alphonsus V.; "Adhesion" entry from Kirk-Othmer Encyclopedia of Chemical Technology. John Wiley and Sons; Mar. 15, 2002; 17 pages.

* cited by examiner

SYSTEM AND METHOD FOR CONVERTING CHEMICAL ENERGY INTO ELECTRICAL ENERGY USING NANO-ENGINEERED POROUS NETWORK MATERIALS

CROSS-REFERENCE TO RELATED APPLICATIONS

This application is a continuation of U.S. patent application Ser. No. 13/945,864 filed Jul. 18, 2013. Priority to this patent application is expressly claimed, and the disclosure thereof is hereby incorporated herein by reference in its entirety. This application claims the benefit of Provisional Application Nos. 61/676,285 filed Jul. 26, 2012, 61/712,712 filed Oct. 11, 2012, 61/716,889 filed Oct. 22, 2012, and 61/724,764 filed Nov. 9, 2012. Priority to these provisional applications is expressly claimed, and the disclosures of the provisional applications are hereby incorporated herein by reference in their entirety.

FIELD

This patent document relates generally to energy conversion systems and more particularly relates to a method and system for converting chemical energy into electrical power using solid-state electric generators using planar or three dimensional surfaces that comprise porous material networks such as a nano-wire arrays or nano-engineered structures, or nano-particles, or colloidal paste.

BACKGROUND

The use of solid state electric generators to convert chemical energy into electricity has recently been demonstrated, as explained, for example, in U.S. Pat. Nos. 6,268,560, 6,649,823, 7,371,962, and 7,663,053. U.S. Pat. Nos. 6,268,560, 6,649,823, 7,371,962, and 7,663,053 are hereby incorporated herein by reference in their entirety. Such energy conversion devices efficiently convert chemical energy to electricity. For example, FIG. 1 herein illustrates a solid state electric generator along with graphs showing characteristics of such a device. As shown in cross section in FIG. 1-A herein, a charge carrier, usually an electron e⁻, is energized on or near a conducting surface 10A by an energizer 12A. The charge carrier is energized, for example, by chemical reactions. In each case the charge carrier is injected into a semiconductor conduction band. For example, the charge carrier ballistically moves from a conductor 10A into a semiconductor or dielectric 11A. The conductor 10A is so thin that the electron effectively travels through it ballistically, without losing energy or colliding with another electron or atom. Since an energy offset exists between the semiconductor conduction band and the Fermi level of the catalyst, the result is a voltage 14A across positive terminal 17A and negative terminal 16A. In FIG. 1-A, the dielectric junction 15A is a semiconductor junction specifically chosen to create an electrical potential voltage barrier which tends to impede the electron ballistic motion, shown as 11B in FIG. 1-B. FIG. 1-B shows the electrical potential in the device as a function of distance along the device at zero bias.

The potential voltage barrier can be formed in any one of many ways, for example, a Schottky barrier as shown in FIG. 1-C, a p-n junction in FIG. 1-D, or a conductor-dielectric-conductor junction, FIG. 1-E. The dielectric is electrically conductive. A forward biased diode provides one of the simplest methods to implement this energy converting device. FIG. 1-C depicts a forward biased Schottky diode whose positive terminal is a conductor/metal.

SUMMARY

The present patent document describes various embodiments having novel three dimensional device structures that can be on a planar two-dimensional substrate or on a three-dimensional substrate. The various embodiments improve on earlier solid state electric generators by increasing amount of power (i.e., electricity) that can be produced per unit of two-dimensional area of a device. The novel device structures described herein have solid-state junctions. These device structures comprise porous semiconductor or dielectrics and nano-clusters of conductor and/or catalyst to form the solid-state junctions. Even though there are voids in the composite system, different porous semiconductor/catalyst materials, as an example, can be an integrated system or the materials may be physically connected as a network. Nano-clusters are when materials form nano-sized clusters. The solid-state junctions can be, but are not limited to, Schottky diodes or p-n junctions. Also disclosed are methods/processes to fabricate the disclosed device structures, specifically for converting chemical energy directly into electrical potential to produce power.

An energy conversion device for conversion of chemical energy into electricity is disclosed. A first aspect of the energy conversion device comprises a first electrode connected to a substrate. A porous semiconductor (or dielectric) layer is disposed over the substrate (with an optional non-porous semiconductor (or dielectric) layer being in-between the substrate on the porous semiconductor (or dielectric) layer. A porous catalyst material is located on at least a portion of the porous semiconductor (or dielectric) layer. At least some of the porous catalyst material enters the nano-engineered structure of the porous semiconductor layer, which forms an intertwining region. A second electrode is present, and an electrical potential is formed between the first electrode and a second electrode during chemical reactions between a fuel, the porous catalyst material, and the porous semiconductor network.

In another aspect disclosed herein, the substrate of the energy conversion device is patterned to create a three-dimensional surface, thereby providing increased surface area for chemical reactions.

In another aspect disclosed herein, the substrate of the energy conversion device is patterned such that nano-wires are formed.

In another aspect disclosed herein, the substrate of the energy conversion device is textured such that peaks and valleys are formed.

In another aspect disclosed herein, the energy conversion device has a non-porous semiconductor layer in between the substrate and the porous semiconductor layer.

BRIEF DESCRIPTION OF THE DRAWINGS

The accompanying drawings, which are included as part of the present specification, illustrate various embodiments and together with the general description given above and the detailed description of the embodiments given below serve to explain and teach the principles described herein.

FIG. 1-B illustrates a graph of potential energy versus distance from the device's topmost surface and indicating the effect of a potential barrier in a solid-state junction.

FIG. 1-C illustrates a graph of potential versus distance from the device's topmost surface in an exemplary solid-state electric generator having a Schottky barrier.

FIG. 1-D illustrates a graph of potential versus distance from the device's topmost surface in an exemplary solid-state electric generator having a p-n junction potential barrier.

FIG. 1-E illustrates a graph of potential versus distance from the device's topmost surface in an exemplary solid-state electric generator having a conductor-dielectric-conductor potential barrier.

FIG. 9b is a microscopic image of a cross section of an exemplary three-dimensional energy converter on a three-dimensional textured substrate as in FIG. 9a.

FIG. 9c is a microscopic image of a top view of an exemplary three-dimensional energy converter on a three-dimensional textured substrate as in FIG. 9a.

Figure 1:
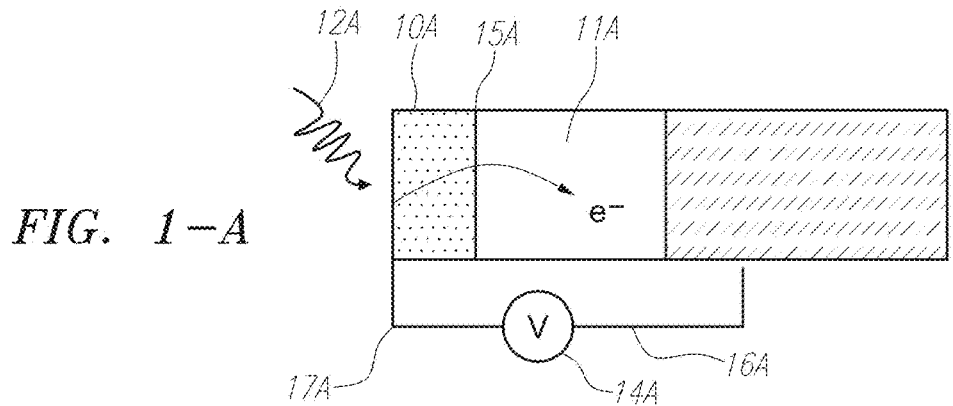
FIG. 1-A illustrates a solid-state electric generator.
Figure 1:
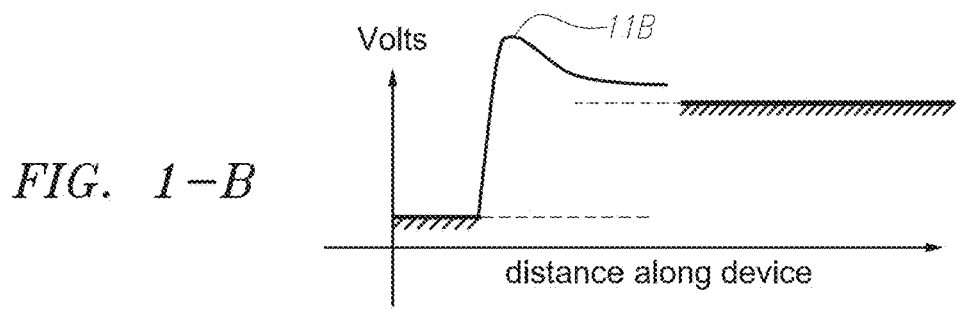
Figure 1:
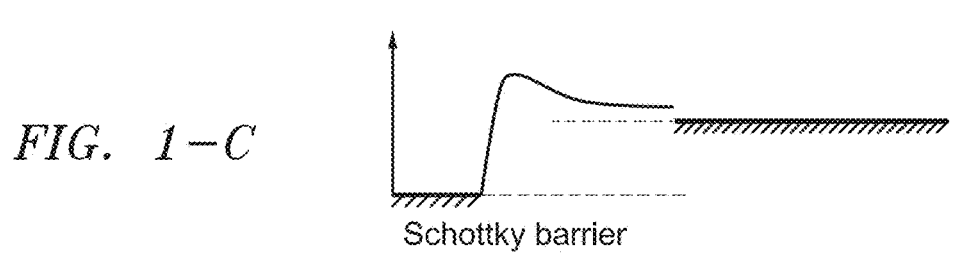
Figure 1:
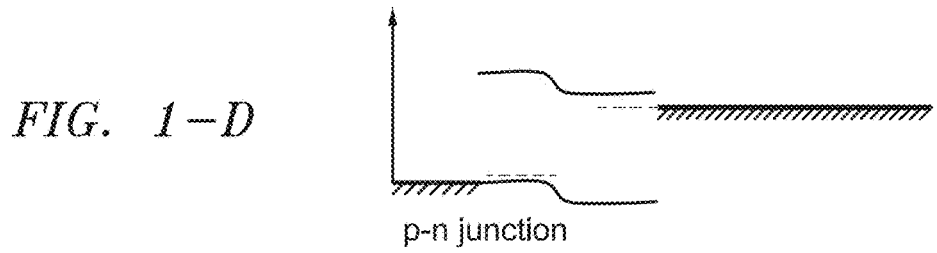
Figure 1:
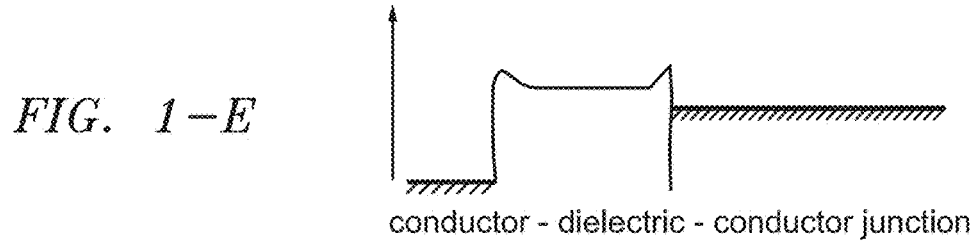

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

DETAILED DESCRIPTION

A method and apparatus for converting chemical energy into electricity is described. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Device structures and methods/processes described herein, for example, in FIGS. 4-9, include but are not limited to: (a) nanowires, nanofibers, or nanotubes; (b) porous nano-engineered structures with interconnecting walls and pores; and (c) porous nano-engineered structures with percolating networks. Fabrication methods/processes include but are not limited to direct film growth resulting in porous structures or/and nano-engineered structures. Methods of fabricating such devices include but are not limited to (i) stain oxidation and etching; (ii) dry and/or wet oxidation and etching; (iii) electrochemical oxidation and etching; (iv) anodization oxidation and etching; (v) micro-arc oxidation and etching; nano-particles of semiconductor(s), dielectric (s), metal(s), catalyst(s), metal salts in solvents, pastes, or colloids; and (vi) solgel processes. For certain semiconductors and dielectrics, e.g., silicon, only etching is required for all these fabrication methods/processes to introduce porosity and nano-engineered structures in the materials.

In certain embodiments, a chemical energy conversion device is described that utilizes porous semiconductor or dielectric and porous catalyst integrated one unit/network on a planar two-dimensional substrate or a three-dimensional substrate. A porous thin film of dielectric or semiconductor, such as a titanium dioxide ($TiO_2$), which is sometimes referred to as titanium oxide, semiconducting network, can be fabricated by depositing a thin film of metallic titanium (Ti) on a non-porous planar substrate such as silicon, or on a non-porous supporting layer deposited on a planar substrate, such as a non-porous $TiO_2$ layer on silicon. This deposited thin metallic Ti film can subsequently be oxidized to create $TiO_2$ and further modified to form nano-porous holes in its microstructure through (i) stain oxidation and etching, (ii) dry or wet oxidation and etching, (iii) electrochemical oxidation and etching, (iv) anodization oxidation and etching, or (v) microarc oxidation and etching. Chemical reagents involved in all these processes include but are not limited to hydrofluoric acid (HF), nitric acid ($HNO_3$), sulfuric acid ($H_2SO_4$), hydrogen peroxide ($H_2O_2$), or/and sodium hydroxide (NaOH). An additional non-porous layer of material functioning as a barrier layer can also be inserted between the deposited metallic Ti thin film and the planar substrate in order to further enhance device electrical performance. In another example the substrate itself can be a three-dimensional structure such as but not limited to porous silicon, textured silicon surfaces, and patterned silicon wafers. Likewise an additional non-porous thin layer of semiconductor or dielectric such as $TiO_2$ may be inserted between the metallic Ti layer and the three-dimensional substrate described above.

Although the various embodiments disclosed herein are described as using $TiO_2$, wherever $TiO_2$, is discussed, other materials such as thin films of porous semiconductors and dielectrics with nano-engineered structures can be used without departing from the teachings herein. Such other thin-film porous materials include but are not limited to silicon; $Al_2O_3$; GaN; GaAs; Ge; silica; carbon; oxides of niobium, tantalum, zirconium, cerium, tin, and vanadium. These materials also apply to the underneath planar and three-dimensional substrates or supporting layers. The same processing methods can also be used in device fabrications.

As will be discussed, catalysts and/or conductors are placed on the internal and external surfaces of the porous semiconductor to create a plurality (and preferably, and large number) of solid state junctions. The catalysts and/or conductors that can be used to form the solid-state junctions with the porous nano-engineered semiconductor or dielectric network(s) can be noble metals such as but are not limited to Pt, Au, or Pd. These conductors and/or catalysts can be deposited using a number of methods, including but not limited to using nanoparticles or/and metal salts in solvents, pastes, or colloids; thin film deposition followed by annealing to nucleate the formation of nano-particles or a combination of pastes/solvent/deposition methods; chemical vapor deposition (CVD); sputtering; evaporation; atomic layer deposition (ALD); or solgel processes.

Figure 2:
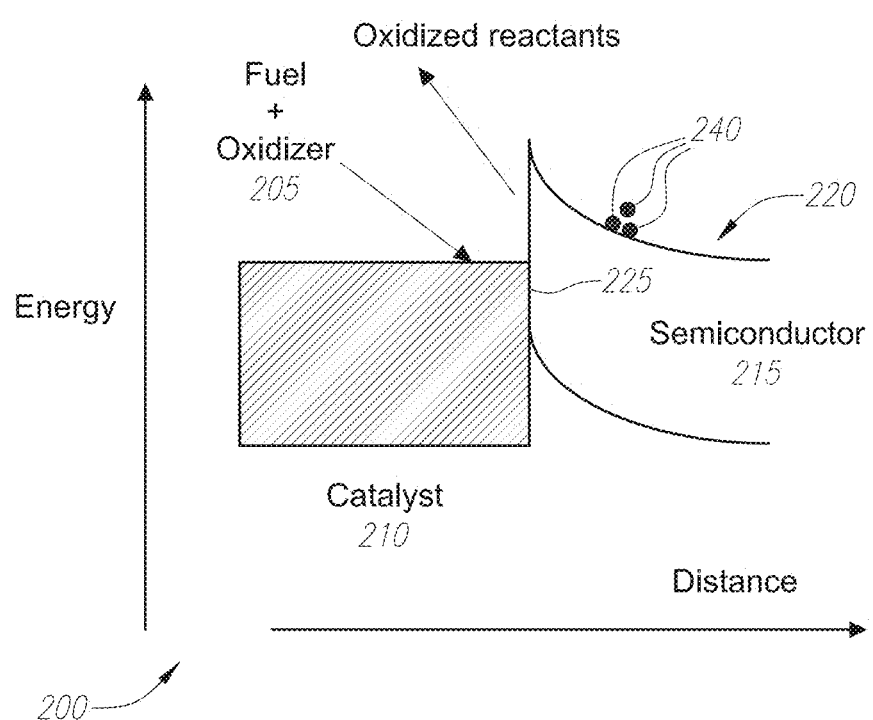
FIG. 2 illustrates the energy band diagram for a catalyst-semiconductor interface

Turning to FIG. 2, a mechanism for energy conversion is described. FIG. 2 depicts an energy band diagram 200 for a catalyst-nanowire interface for an energy conversion device. Fuel plus oxidizer 205 comes into contact with the catalyst 210, which oxidizes upon contact. The oxidized fuel 210 injects electrons 240 into the conduction band 220 of the semiconductor 215. There, the electrons 240 encounter a Schottky-like potential barrier 225 between the semiconductor 215 and the catalyst 210, which may be a conductor, and may also be a top electrode layer (not shown) that embeds the catalyst. The electrons 240 are then directed towards the bottom contact (not shown) by the built-in electric field at the interface between the catalyst 210 and the semiconductor 215. The electrons 240 travel in the external circuit (not shown), thereby transferring their energy to the load before returning to the catalyst site via the top contact (also not shown). The electrons 240 then complete the reaction by reducing the oxidized reactants producing the final products. The output voltage of the circuit shown in FIG. 2 will depend on the potential offset (barrier) between the Fermi level in the catalyst and the conduction band of the semiconductor.

Figure 3:
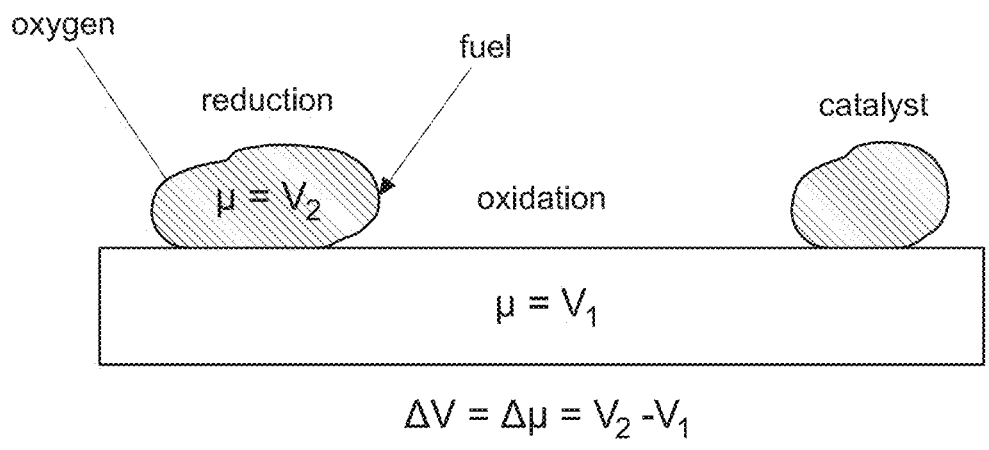
FIG. 3 illustrates the schematics of EMF generation mechanism

Alternatively, the semiconductor/catalyst surface may favor one of the oxidation or reduction reactions, effectively splitting the two reactions. This can create an electrochemical potential gradient between the catalyst site and the semiconductor surface, which can induce an electro-motive force (EMF) in an external circuit and drive a load as shown in FIG. 3. In other words, as schematically shown in FIG. 3, the oxidation-reduction (redox) reactions induce an electron's chemical potential difference between the catalyst sites and the semiconductor sites, which in turn gives rise to an EMF ($\Delta\mu=V_2-V_1$).

The various embodiments described herein are chemical energy conversion devices that convert chemical energy to electricity. A limiting factor of prior devices using similar electron transport mechanisms as those described herein was the rate at which catalytic reactions could take place. Electricity generation of chemical energy converter devices like those described herein is proportional to the reaction rate and fuel conversion, and the reaction rate and fuel conversion are proportional to at least (i) the temperature at which the catalytic reactions take place, and (ii) the total surface areas of the catalyst. Increasing the surface area, however, generally leads to devices that become large two-dimensionally, and thus increases the size of the device, which is undesirable. Likewise, temperatures can be increased to enhance reaction rate, but increasing temperature can also be undesirable. The various embodiments described herein overcome these problems by increasing the surface area of the chemical energy converter device without significantly increasing the two-dimensional area of such devices.

Figure 4:
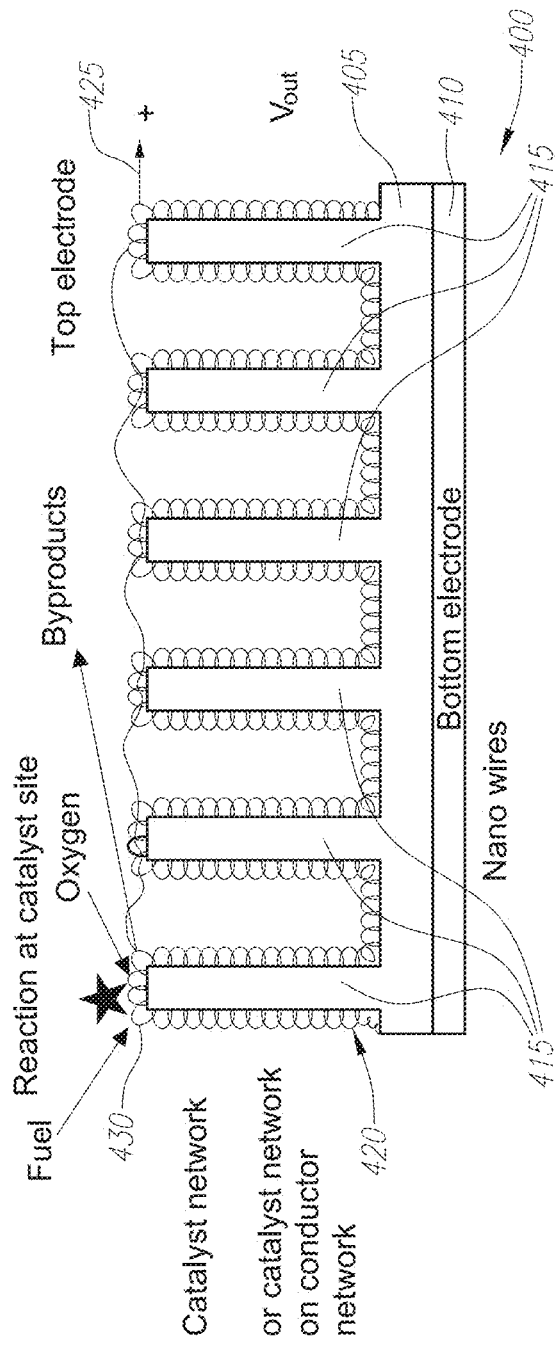
FIG. 4 illustrates a schematic cross-section of a portion of a nanowire material array with a catalyst network.

FIG. 4 illustrates an embodiment of a chemical energy converter device 400. In particular, FIG. 4 illustrates a device having nanowires 415, which are formed on a substrate layer (not shown), where the substrate layer can comprise a porous thin film of dielectric or semiconductor, such as a titanium oxide ($TiO_2$). The substrate layer is formed on an electrode 410, which can be made with a metal conductive material or highly n-doped semiconductor material. Electrode 410 can be below the substrate layer or in-between the substrate and the nanowires 415. Nanowires 415 can comprise either a nano-engineered porous semiconductor material or a nano-engineered porous dielectric. Either way, nanowires 415 form an electrically conductive array. Catalyst material 420 is on the surface of the nanowire 415, although intervening materials are possible as well. The catalyst material 420 can be platinum particles, where each platinum particle forms a Schottky diode junction with the semiconductor material forming the nanowires 415. In use, a fuel or energy source 430 such as hydrogen, or methanol or natural gas, and air, or a monopropellant energy source or fuel such as hydrogen peroxide comes in contact with the catalyst 420, which causes electrons from the catalyst 420 to be injected into the semiconductor 405, which are then attracted to the electrode 410. This generates electricity. A second electrode 425 is formed over the catalyst 420, which, in conjunction with the bottom electrode 410 allow a circuit to be formed so that electrical current will flow and a voltage potential $V_{out}$ is generated between the electrodes.

Nanowires 415 provide several advantages that improve the overall efficiency. The first advantage is increased surface area, which is provided by both the use of a porous substrate 405 and nanowires 415. Porous three-dimensional structures have a high surface to volume ratio when compared to non-porous two-dimensional planar layers. In addition, the nanowires 415 themselves have surface area, meaning that each nanowire 415 provides significantly more surface area than the same two-dimensional area would have provided were no nanowire 415 present. The additional surface area provided by the porous substrate 405 and the nanowires will have the ability to have more catalyst material disposed thereon, especially when compared to energy conversion devices that are two-dimensional. This is because presence of catalyst nano-particles, nano-clusters, or nano-wires on such a porous substrate provides more reaction sites for chemical reactions leading to increased reaction rates at lower temperatures. Another advantage is that porous network also facilitates diffusion of reactants to catalysts located on the internal surfaces of the nanowires and removal of reaction products away from the catalysts.

In an embodiment, nanowires 415 are comprised of single crystal $TiO_2$ nanowires, which enhance electron transport, can be synthesized in various simple inexpensive methods, such as growth from an epitaxial seed layer from a titanium source e.g. in a hydrothermal process. The bottom contact 410 is a conductive substrate with a conductive layer that provides an epitaxial template for nanowire growth, e.g. FTO (fluorinated tin oxide) in the case of $TiO_2$ nanowires. The top contact 425 has to electrically connect the porous network of the catalyst. The catalyst can be a paste or an electrolyte. Again, the conductor and or catalysts can be deposited used nano-particle pastes, nano-particle solvents, thin film depositions or any combinations thereof.

Figure 5A:
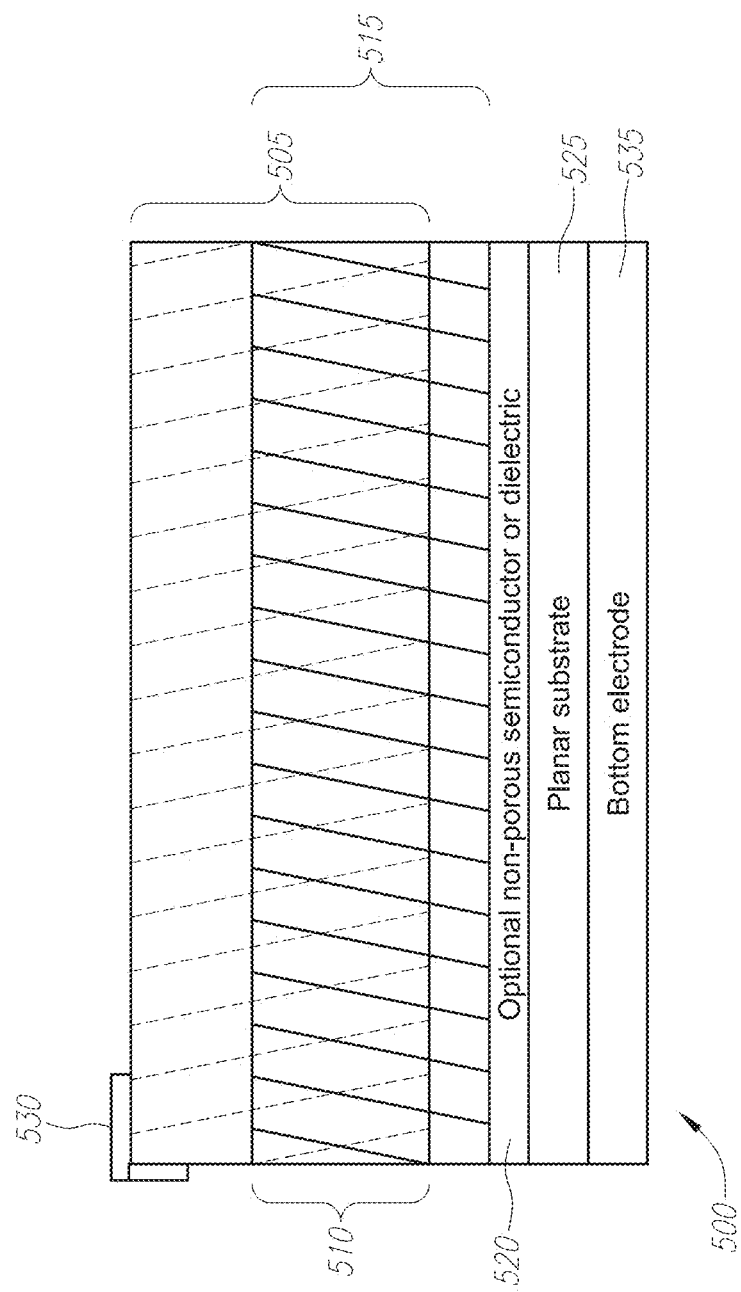
FIG. 5a depicts a cross-sectional view of a three-dimensional porous network which consists of a porous catalyst three-dimensional layer that intertwines three-dimensionally with another porous semiconductor or dielectric three-dimensional layer on a planar two-dimensional substrate. A non-porous interlayer can optionally be inserted between the planar substrate and the porous three-dimensional layers/networks above.
Figure 5B:
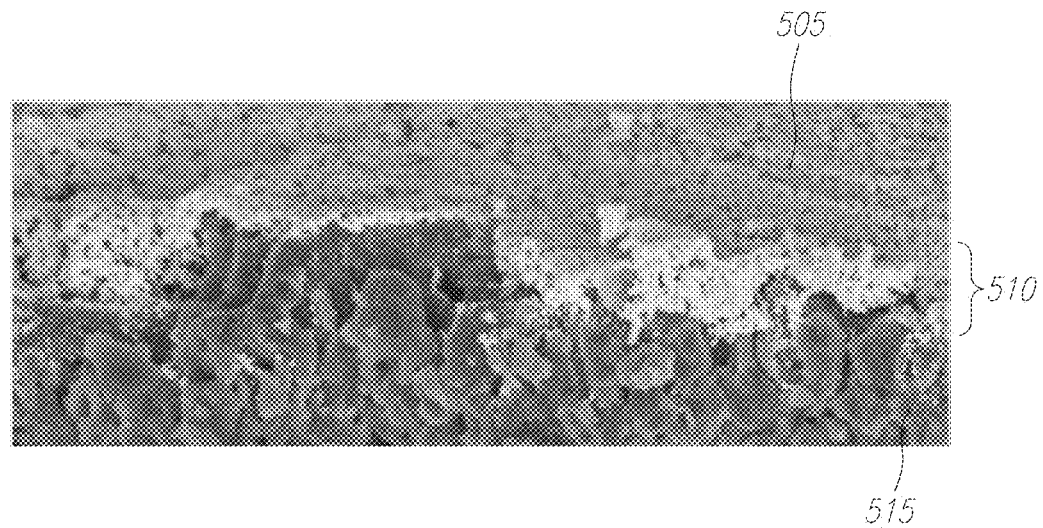
FIGS. 5b is a cross-sectional microscopic view of a three-dimensional porous network which consists of a porous catalyst three-dimensional layer that intertwines three-dimensionally with another porous semiconductor or dielectric three-dimensional layer.
Figure 5C:
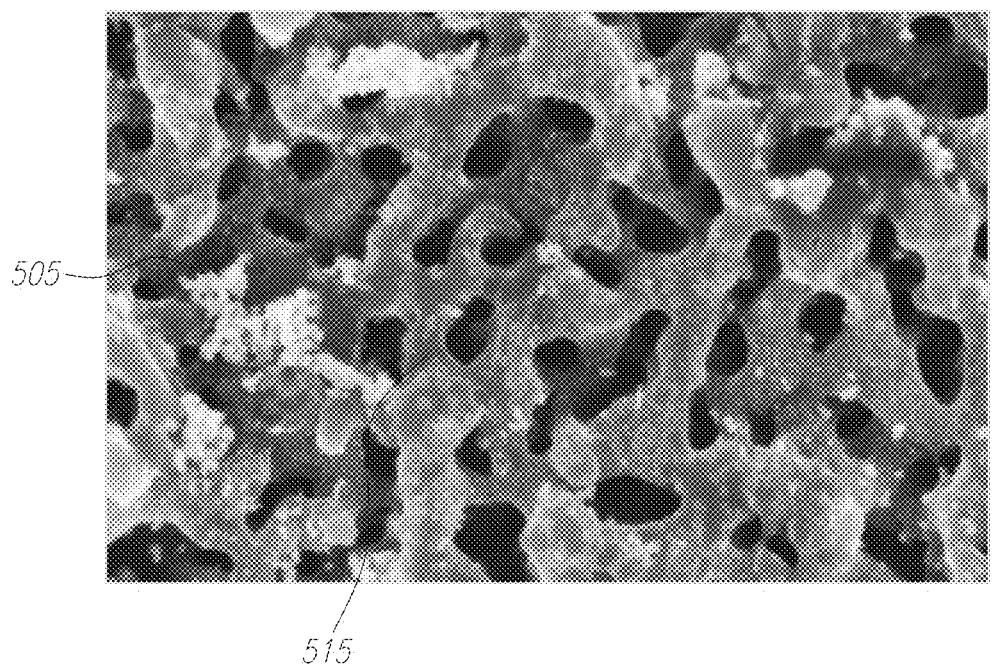
FIGS. 5c is a top microscopic image of an energy converter having a three-dimensional porous network which consists of a porous catalyst three-dimensional layer that intertwines three-dimensionally with another porous semiconductor or dielectric three-dimensional layer.

FIG. 5a illustrates another embodiment of an energy converter device comprising a three-dimensional porous catalyst layer 505 intertwined three-dimensionally with porous semiconductor or dielectric layer 515 at an intertwining region 510, which in turn can be placed on a planar substrate 525. Layer 515 can be constructed with $TiO_2$ as discussed above, and can take the form of a honeycomb-like structure being either a nano-engineered structure having interconnecting walls defining pores, or nano-engineered structures with percolating networks. Either way, the honeycomb-like structure allows catalyst nano-particles from the catalyst layer to enter the spaces of the honeycomb structure and rest on the surface of the semiconductor or dielectric layer 515. It is this honeycomb structure that makes layer 515 porous in three dimensions. These nano-particles can, for example, be platinum. The honeycomb-like structure of the semiconductor or dielectric layer 515 can be seen in the photographs of FIGS. 5b-5c.

Likewise, the three-dimensional porous catalyst layer 505 can comprise porous networks, individual nano-clusters/particles, or a combination of both, and can be constructed from, for example, platinum. As with porous semiconductor or dielectric layer 515, catalyst layer can take the form of a honeycomb-like structure. An exemplary three-dimensional porous layer 505 can be seen in the photographs of FIGS. 5b-5c. A feature of the intertwining region 510 is its large internal surface area where catalysts can be distributed throughout to construct a three-dimensional network of catalyst-semiconductor junctions. An exemplary intertwining region 510 can be seen in the photographs of FIGS. 5b-5c.

Chemical energy converter 500 can optionally include a non-porous semiconductor or dielectric layer 520 deposited through standard deposition methods such as evaporation, chemical vapor deposition (CVD), sputtering, or atomic layer deposition (ALD), to provide a barrier layer between the substrate below and the porous materials above.

In the embodiment illustrated by FIG. 5, a top electrode 530 can be formed on part or all of catalyst layer 505. Likewise, a bottom electrode 535 can be formed underneath planar substrate 520. These two electrodes can be electrically connected to an external load to form a complete circuit.

Figure 6:
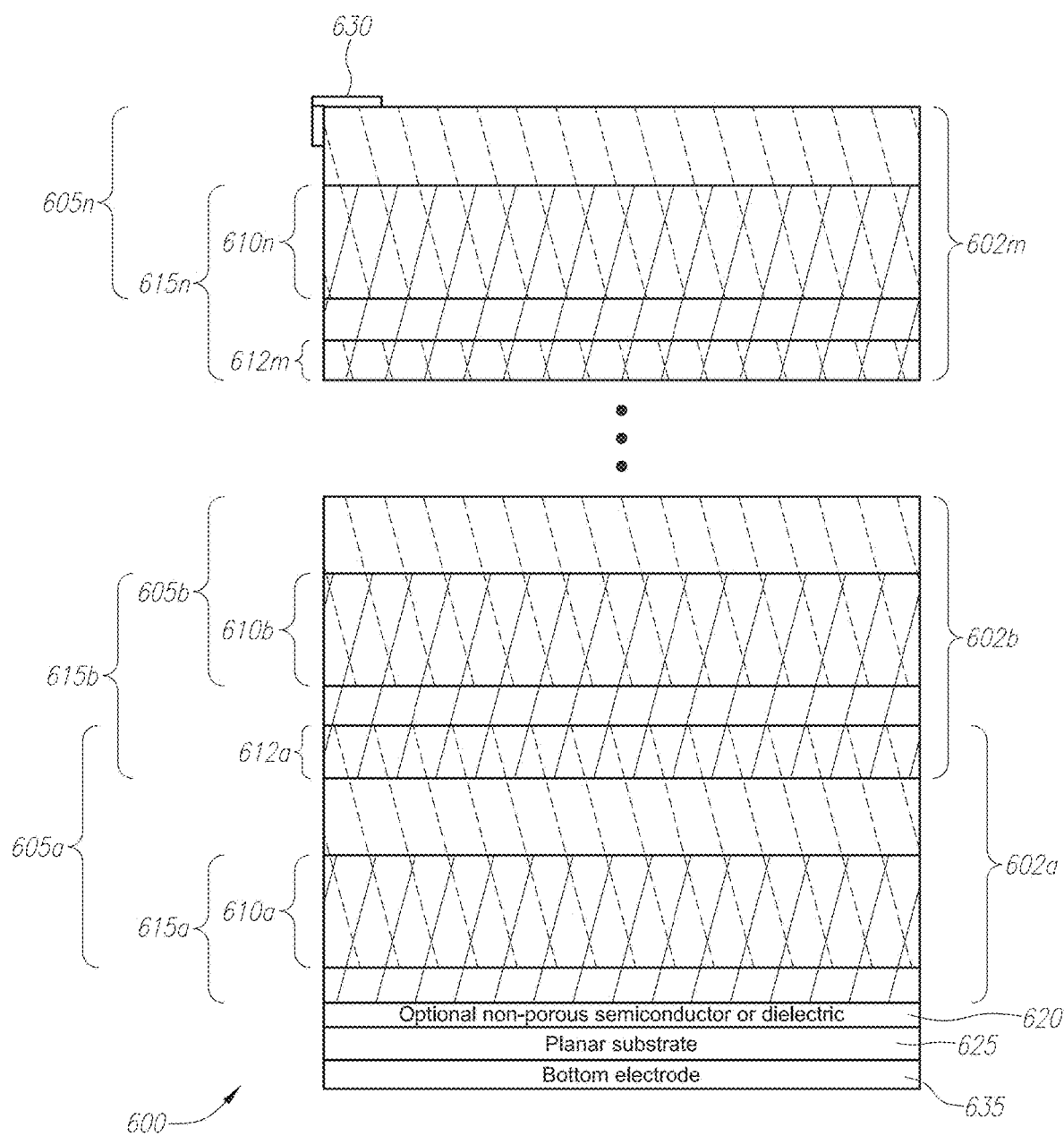
FIG. 6 shows an energy converter having a multi-cell device structure with multiple layers of three-dimensional porous catalyst and three-dimensional porous semiconductor or dielectric networks on a planar substrate. A non-porous interlayer can be inserted or not between the planar two-dimensional substrate and the porous three-dimensional layers/networks above.

FIG. 6 shows yet another embodiment, where a plurality of chemical energy converter devices 500 as in FIG. 5(a) are arranged as n cells 602a-602n and are thus stacked on top of each other. A chemical energy converter 600 as shown in FIG. 6 is a multi-cell device structure with multiple layers of porous catalyst 605a-605n and porous semiconductor/dielectric networks 615a-615n that can be fabricated and integrated vertically on a planar two-dimensional substrate. In particular, chemical energy converter 600 can have a bottom electrode 635, which has a planar substrate 625 disposed thereon. A non-porous semiconductor or dielectric layer 620 can, if desired, be placed on the planar substrate 625. Use of such a layer 620 acts as a barrier layer between substrate below and the porous materials above. The first cell 602a of the chemical energy converter 600 comprises a porous layer 615a comprised of a semiconductor or dielectric material, which can be constructed, for example, from $TiO_2$. The first cell 602a also comprises a three-dimensional porous catalyst layer 605a that is placed thereon using methods described above, and can comprise porous networks, individual nano-clusters/particles, or a combination of both. Catalyst layer 605a can be constructed from, for example, platinum. At the interface between layer 615a and catalyst layer 605a, the materials intertwine three-dimensionally in a first intertwined region 610a.

To increase the amount of energy generated, chemical energy converter device 600 has additional cells 602b through 602n stacked on top of each other. For example, a second cell 602b comprised of second porous layer 615b and second catalyst layer 605b are formed above the first cell, with a three-dimensional intertwined region 612a formed between the first cell 602a and second cell 602b. Likewise a third three-dimensional intertwined region 610b is formed between the second catalyst layer 605b and second porous semiconductor or dielectric layer 615b.

To further increase energy generation, n additional cells 602n can be added to chemical energy converter 600. Each of the additional cells is comprised of n second catalyst layers 605n and n porous semiconductor or dielectric layers 615n, with a three-dimensional intertwined region 610n formed at every interface between catalyst layers 605n and porous semiconductor or dielectric layer 615n. A three-dimensional intertwined region 612a-612m will be formed between each cell. Such multi-cell structures significantly increase the total catalyst-semiconductor interfacial area without including a larger device, thereby increasing fuel conversion via chemical reactions and corresponding electrical output.

Figure 7:
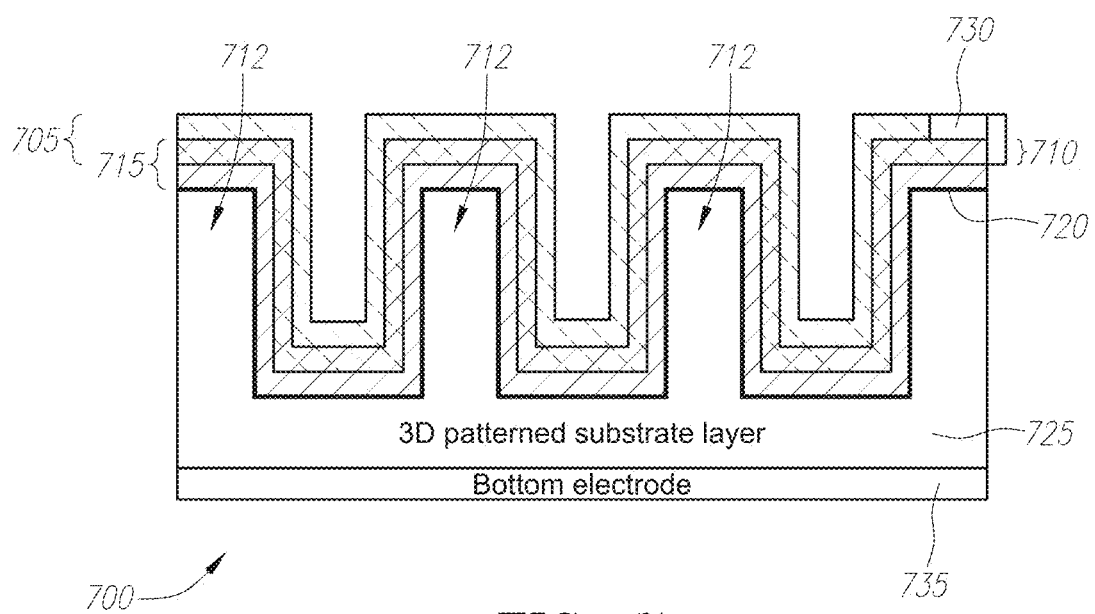
FIG. 7 shows an exemplary energy converter having a patterned three-dimensional network of porous catalyst and porous semiconductor or dielectric on a three-dimensional substrates, in which the internal and external surfaces are covered with a porous semiconductor or dielectric layer/network that intertwines with a porous catalyst layer/network three-dimensionally. An optional non-porous layer can also be inserted between the three-dimensional substrates and the three-dimensional catalyzed porous semiconductor or dielectric layer/network.

Yet another embodiment illustrated in FIG. 7, in which a chemical energy converter 700 has the integration of porous catalyst and porous semiconductor described in FIG. 5 constructed on a three-dimensional surface. Such a three-dimensional surface has surface area larger than a planar two-dimensional substrate, which results in increased fuel conversion and reaction rates, which in turn increases the amount of electricity generated. In particular, the embodiment described with reference to FIG. 7 has a bottom electrode 735. A three-dimensional substrate 725 is fabricated thereon using, for example, a standard lithography patterning/etching process. In this embodiment substrate 725 forms a patterned three-dimensional network microtrenches 712. If desired, a non-porous layer 720 can be placed over the patterned substrate 725, which acts as a barrier layer between the substrate below and the porous materials above. As in the embodiment shown in FIG. 5, a porous semiconductor/dielectric network 715 is placed over patterned substrate 725 (or non-porous layer 720, if present). A catalyst layer 705 is placed over the porous semiconductor/dielectric network 715, which also enters the pores of the porous semiconductor/dielectric network 715 to form an intertwining region 710. A second electrode 730 is placed above a catalyst layer 705, and in combination with first electrode 735, allows a voltage to appear, and hence allows for the use of the electricity generated by the converter device 700.

Figure 8:
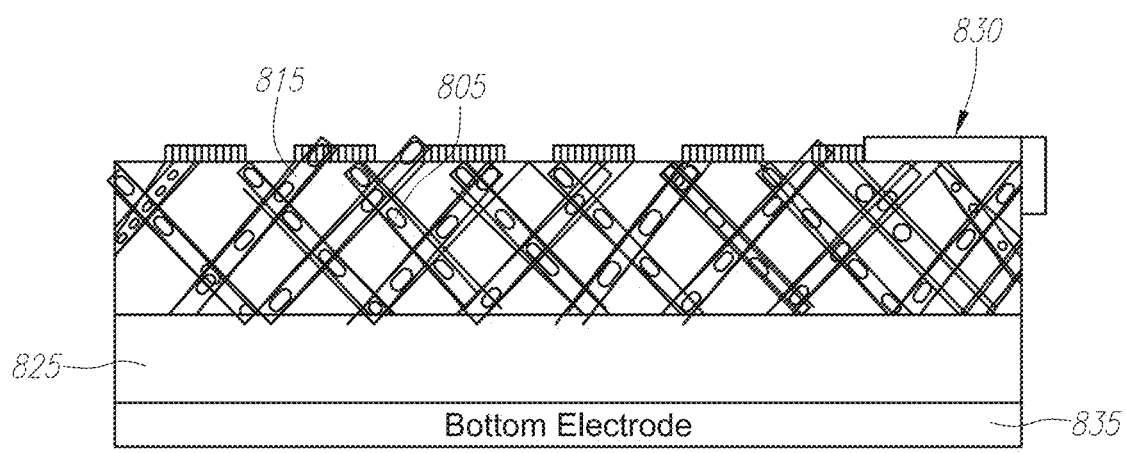
FIG. 8 shows an exemplary energy converter having three-dimensional porous substrate/supporting layer (partially or fully) network of porous catalyst and porous semiconductor or dielectric on a three-dimensional substrates, in which the internal and external surfaces are covered with a porous semiconductor or dielectric layer/network that intertwines with a porous catalyst layer/network three-dimensionally. An optional non-porous layer can also be inserted between the three-dimensional substrates and the three-dimensional catalyzed porous semiconductor or dielectric layer/network.

FIG. 8 shows an embodiment of a chemical energy converter 800 comprising a porous three-dimensional substrate/supporting layer 825 where internal and external surfaces are covered with the integration of a porous semiconductor or dielectric layer 815 and a porous catalyst 805 similar to that described in FIG. 5. In particular, chemical energy converter device 800 has a bottom electrode 835, upon which a porous substrate/supporting layer 825 is placed thereon.

A second electrode 830 is placed above layer 825, and in combination with first electrode 835, allows a voltage to appear, and hence allows for the use of the electricity generated by the converter device 800.

Three-dimensional porous substrate is typically amorphous, which, upon annealing can crystallize. Nano-engineered structures typically consist of interconnected walls and wires forming a highly porous structure. The size of the pores, the thickness of the porous layer, among other physical and electrical properties, can be tuned by the processing parameters.

Another method to create a nano-engineered porous network or layer of semiconductor or dielectric, for example $TiO_2$, as a support to the catalyst above it, is to utilize a paste of $TiO_2$ nano-particles to form thin films of porous layers/networks.

Figure 9A:
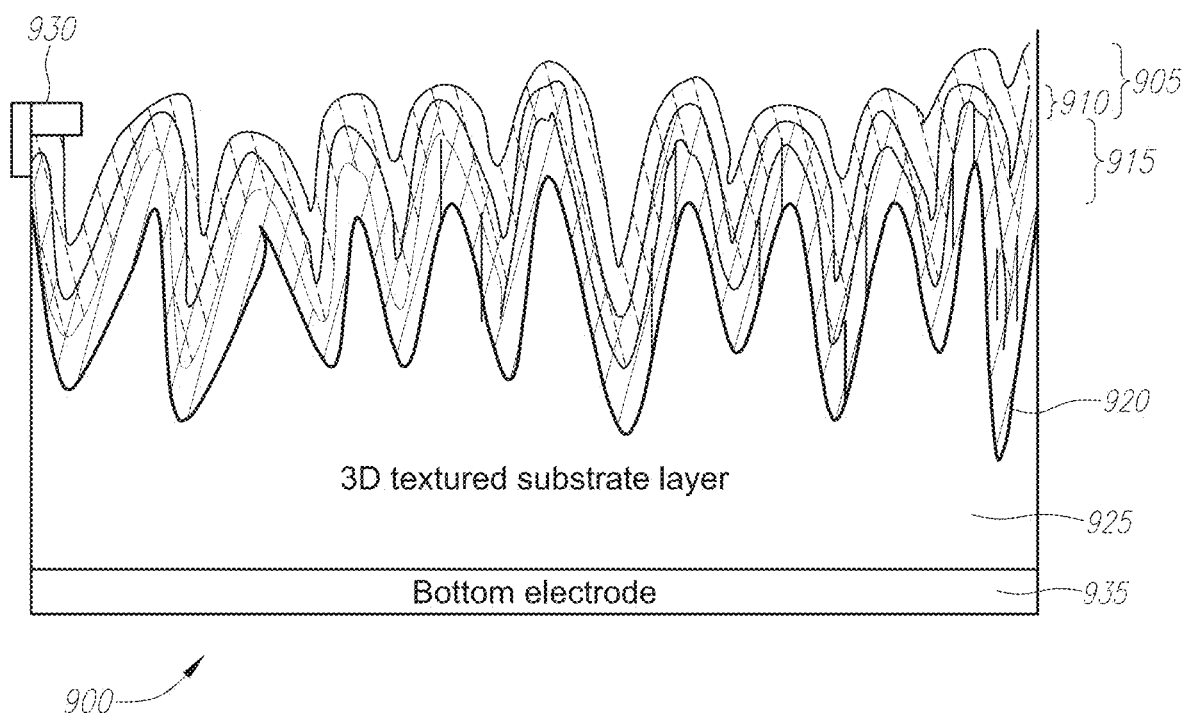
FIG. 9a shows an exemplary energy converter having a textured three-dimensional network of porous catalyst and porous semiconductor or dielectric on a three-dimensional substrates, in which the internal and external surfaces are covered with a porous semiconductor or dielectric layer/network that intertwines with a porous catalyst layer/network three-dimensionally. An optional non-porous layer can also be inserted between the three-dimensional substrates and the three-dimensional catalyzed porous semiconductor or dielectric layer/network.

FIG. 9a shows an embodiment having a three-dimensional textured substrate/supporting layer 925 where the surface is covered with the integration of porous semiconductor or dielectric material layer 915 and porous catalyst 905 like the embodiment described in FIG. 5. In particular, the chemical energy converter 900 illustrated in FIG. 9 has a bottom electrode 935. Placed thereon is a three-dimensional textured substrate 925, which for example can be created by etching a silicon wafer.

Textured substrate 925 forms peaks and valleys, thereby creating a three-dimensional reaction area. This three-dimensional reaction area increases the surface area available for chemical reactions, which increases the number of reactive sites that can take place during a particular amount of time for a given device size, thereby increasing the electrical generation capability of the energy converter 900. If desired, a non-porous layer 920 can be placed over the textured substrate 905. As above, the non-porous layer 920 provides a barrier layer to separate the substrate below and the porous materials above. A porous or semiconductor or dielectric layer 915 is placed over the textured substrate 925 (or non-porous layer, if present).

A catalyst layer 905 is placed over the porous semiconductor/dielectric network 915, which also enters the pores of the porous semiconductor/dielectric network 915 to form an intertwining region 910. A second electrode 930 is placed above a catalyst layer 905, and in combination with first electrode 935, allows a voltage to appear, and hence allows for the use of the electricity generated by the converter device 900.

As in the other embodiments described herein, the use of a textured substrate 905 results in an increased surface area for catalysis, which results in greater electricity generation than an energy converter having a planar two-dimensional substrate.

Figure 9B:
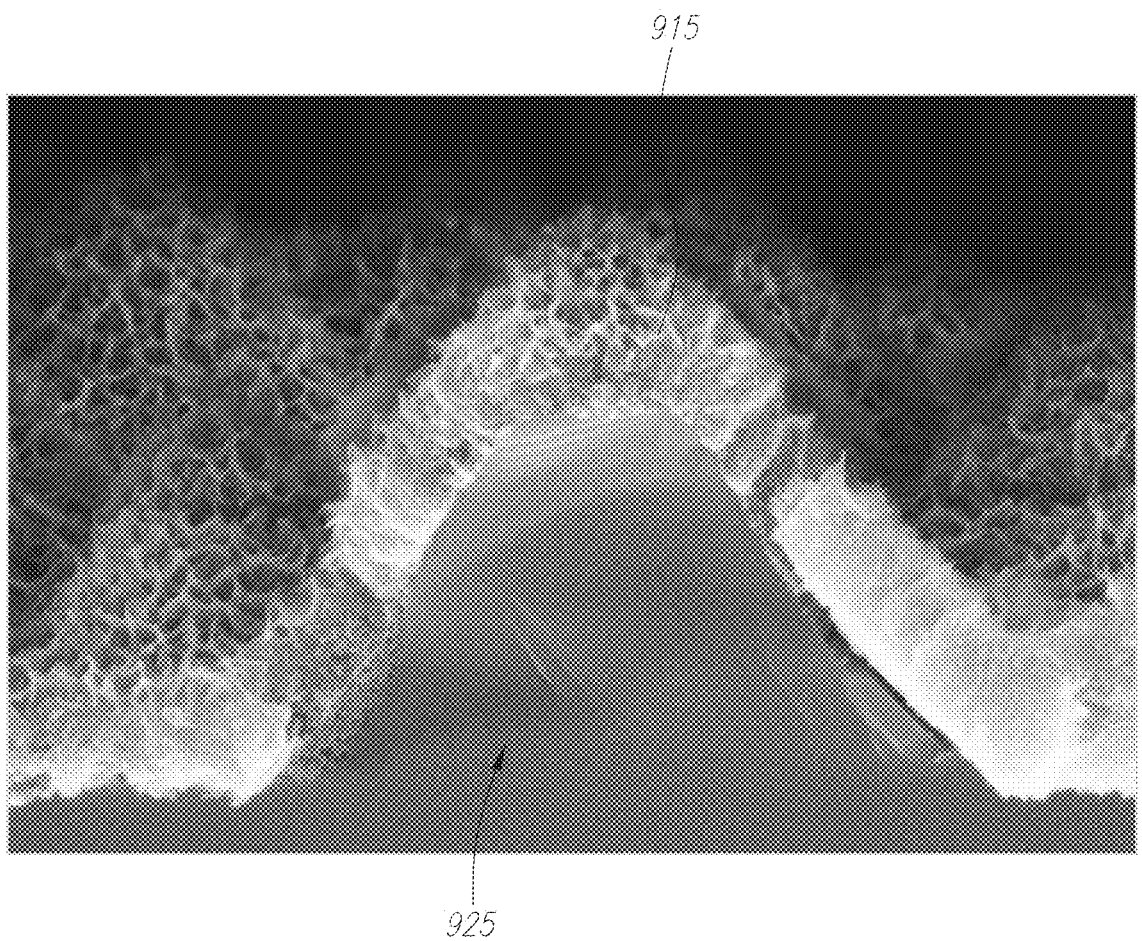
Figure 9C:
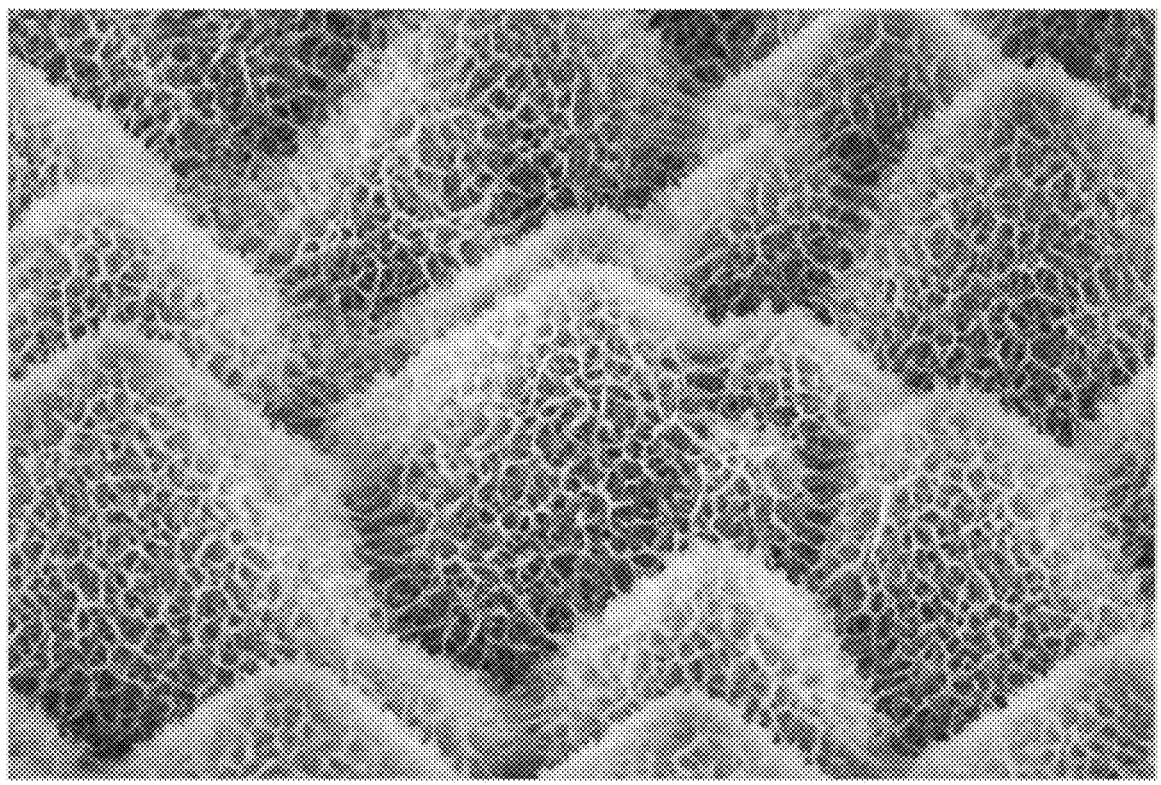

FIG. 9b is a photograph depicting an energy converter as in FIG. 9a having a textured substrate. The photograph shows substrate 925 having a semiconductor or dielectric layer 915 formed thereon. Catalyst layer 905 in the form of nano-particles is over the dielectric/semiconductor layer 915, and nano-particles enter the pores of layer 915 to form an intertwining region. FIG. 9c shows a planar view, where one can see the texture of the dielectric/semiconductor layer 915.

Device structures, and methods/processes to fabricate them, using nanowire arrays, nano-engineered structures, to form porous networks comprising solid-state junctions specifically to convert chemical into electrical energy are described herein. The device structures can be fabricated on a two-dimensional planar substrate or on a three-dimensional substrate. An exemplary method comprises fabricating one or more solid-state electric generators. The solid-state electric generators include one or more chosen from the group including a chemically energized solid-state electric generator. A solid state electric generator energizes charge carriers in a first material forming a junction with a second material. The second material has a finite energy gap with a conduction band that has an offset with the Fermi level of the first material.

The present methods, devices and systems improve the energy conversion efficiency of junctions used in solid-state devices to generate electricity. An energy source injects charge carriers, e.g. electrons, on one side of a junction. When a net excess of charge carriers is injected from one side of a junction to the other, it will be forced to travel in the external circuit by the electric field. The result is the conversion of chemical energy into the useful form of an electrical energy. An element of the embodiments is that the efficiency of this process is improved when the charge transport or mobility is improved in the semiconducting material.

An alternative mechanism for generating power is creating an electrochemical potential difference between the nanowire network or nano-engineered porous networks/layers and the catalyst which can act as an electromotive force (EMF). The semiconductor/catalyst surface may favor one of the oxidation or reduction reactions, effectively splitting the two reactions. This can create an electrochemical potential gradient between the catalyst site and the semiconductor surface which can induce an electro-motive force (EMF) in an external circuit and drive a load.

One embodiment includes nanowire array or nano-engineered porous networks/layers made from dielectric or semiconductor including but not limited to, for example, rutile TiO2, anatase TiO2, poly-crystalline $TiO_2$ porous TiO2, ZrO2, $SrTiO_3$, BaTiO3, $Sr\_x-Ba\_y-TiO\_z$, LiNiO, silicon, SiC; GaN; GaAs; Ge; silica; carbon; oxides of niobium, tantalum, zirconium, cerium, tin, vanadium, and $LaSrVO_3$, and certain organic semiconductors, such as PTCDA, or 3,4,9,10-perylenetetracarboxylicacid-dianhydride. The subscripts x, y and z denote concentrations, per usual conventions. One advantage of $SrTiO_3$ is that Schottky barriers on it may be unpinned, providing a relatively larger barrier compared to that of $TiO_2$.

Fuels, Oxidizers, Autocatalysts, Stimulators

The various chemical energy converter devices described herein use storable reactants including oxidizers, autocatalytic reaction accelerators, decelerators, and monopropellants. The liquid phase, such as liquid hydrogen peroxide $H_2O_2$ at standard pressure and temperature, are convenient because their heat of vaporization is used as coolant and the liquid is conveniently storable. Monopropellants such as $H_2O_2$ and monomethylhydrazine (MMH) are similarly convenient and energize the active surface of converters. Autocatalytic accelerators include monopropellants such as $H_2O_2$.

One embodiment uses reactions and reactants to energize these excitations. The reactions, reactants and additives include at least monopropellants, high energy fuels with oxidizers, hypergolic mixtures, and additives and combinations of reactants known to produce autocatalytic specie, reactants chosen to accelerate reactions or to control reactions, and combinations thereof. The reactants and/or additives include but are not limited to the following reactants:

Energetic Fuels More Storable than Ammonia:
    amine substituted ammonias
    Di-Methyl-Amine $(CH_3)_2NH$
    Tri-Methyl-Amine $(CH_3)_3N$
    Mono-Ethyl-Amine (C2H5)NH2
    Di-Ethyl-Amine $(C_2H_5)_2NH$)

Other Classes More Easily Storable:
    Methanol, $CH_3OH$
    Ethanol, EtOH CH3CH2OH
    Formic Acid, HCOOH
    diesel fuels
    gasoline
    alcohols
    slurries including solid fuels
    Carbon Suboxide, $C_3O_2$, CO=C=CO,
    Formaldehyde HCHO,
    Paraformaldehyde, =better $HCHO)_n$, sublimeable to Formaldehyde gas. (Potentially a cell coolant at the same time).

Less Storable Fuels:
    Carbon Monoxide
    Hydrogen
    Ammonia NH3

Energetic Fuels Containing Nitrogen:
    Nitromethane, $CH_3NO_2$
    Nitromethane "cut" with Methanol=model airplane "glow plug" engine fuel High Energy Fuels with Wide Fuel/air Ratio:
    Epoxy-Ethane, =Oxirane or Ethylene-Oxide CH2-CH2O
    1,three-Epoxy-Propane=Oxetane and Tri-Methylene-Oxide=1,three-Methylene-Oxide $CH_2$—$(CH_2)$—$CH_2O$
    Epoxy-Propane CH2-(CH2)-CH2O
    Acetylene, $C_2H_2$
    Diacetylene=1,three-Butadiyne
    1,three-Butadiene $CH_2$=CH—CH=$CH_2$, Less Exotic High Energy Fuels:
    Di-Ethyl-Ether or surgical ether
    Acetone=Di-Methyl-Ketone Less Exotic, Volatile Fuels:
    Cyclo-Propane
    Cyclo-Butane
    Hydrocarbons such as methane, propane, butane, pentane, etc.

Other Storable Fuels:
    Methyl Formate HCOO—$C_2H_5$
    Formamide HCO—$NH_2$
    N,N,-Di-Methyl-Formamide HCO—N—$(CH_3)_2$
    Ethylene-Diamine $H_2N$—$CH_2$—$CH_2$—$NH_2$
    Ethylene-Glycol
    1,4-Dioxane=bimolecular cyclic ether of Ethylene-Glycol
    Paraldehyde $(CH_3CHO)_3$ cyclic trimer of Acetaldehyde Powerful Oxidizer:
    Tetra-Nitro-Methane, $C(NO_2)_4$ . . . does not spontaneously decompose . . . just pass the two separate vapors over the reaction surface of the cell in the gas phase
    Hydrogen Peroxide H2O2

Low Initiation Energy Mixtures:
    Cyclo-Propane with Oxygen=surgical anesthetic, microjoules initiator Hypergolics:
    UDMH=Unsymmetrical DiMethyl Hydrazine=1,1-DiMethyl Hydrazine $(CH_3)_2NNH_2$
    UDMH is hypergolic usually with $N_2O_4$ and is a very potent carcinogen
    MMH MonoMethyl Hydrazine $(CH_3)HNNH_2$ hypergolic with any oxidizers, e.g. $N_2O_4$ Corrosive Toxic Energetic Monopropellant:
    Hydrazine=$H_2NNH_2$ decomposed easily with a catalyst (usually Pt or Pd or Molybdenum Oxide
    Hydrazine Hydrate Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. An energy conversion device for conversion of chemical energy into electricity, comprising:
    a first electrode;
    a substrate connected to said first electrode;
    a porous semiconductor layer disposed over said substrate, said porous semiconductor layer having a nano-engineered structure;
    a porous catalyst material on at least a portion of said porous semiconductor layer that contacts a fuel and an oxidizer, wherein at least some of the porous catalyst material enters the nano-engineered structure of the porous semiconductor layer to form an intertwining region, the porous catalyst material and the porous semiconductor layer forming solid-state junctions, wherein the solid-state junctions are p-n junctions; and
    a second electrode, wherein electrons from the porous catalyst material are injected into the porous semiconductor layer, and wherein an electrical potential is formed between the first electrode and a second electrode during chemical reactions between the fuel and oxidizer in contact with the porous catalyst material.

2. The energy conversion device of claim 1, wherein the substrate is patterned to create a three-dimensional surface, thereby providing increased surface area for chemical reactions.

3. The energy conversion device of claim 2, wherein the substrate is patterned such that nano-wires are formed.

4. The energy conversion device of claim 2, wherein the substrate is textured such that peaks and valleys are formed.

5. The energy conversion device of claim 1, further comprising a non-porous semiconductor layer is in between the substrate and the porous semiconductor layer.

6. The energy conversion device of claim 1, wherein the porous catalyst layer is formed with nano-particles.

7. The energy conversion device of claim 1 wherein the porous catalyst layer is formed with nano-clusters.

8. The energy conversion device of claim 1, wherein the porous catalyst layer is formed with nano-wires.

9. The energy conversion device of claim 1, wherein the porous semiconductor layer is formed with nano-particles.

10. The energy conversion device of claim 1 wherein the porous semiconductor layer is formed with nano-clusters.

11. The energy conversion device of claim 1, wherein the porous semiconductor layer is formed with nano-wires.

12. The energy conversion device of claim 1, wherein the porous semiconductor layer is a porous nano-engineered structure with percolating networks.

13. The energy conversion device of claim 1, wherein the porous semiconductor layer comprises a dielectric.

14. The energy conversion device of claim 13, wherein the dielectric is a porous nano-engineered structure with percolating networks.

15. The energy conversion device of claim 13, wherein the dielectric is formed with nano-particles.

16. The energy conversion device of claim 13 wherein the dielectric is formed with nano-clusters.

17. The energy conversion device of claim 13, wherein the dielectric is formed with the nano-wires.

18. The energy conversion device of claim 1, where the nanowire array or nano-engineered porous networks/layers are chosen from a group including rutile TiO2, anatase TiO2, poly-crystalline $TiO_2$ porous TiO2, ZrO2, $SrTiO_3$, BaTiO3, Sr_x-Ba_y-TiO_z, LiNiO, silicon, SiC, GaN, GaAs, Ge, silica, carbon, oxides of niobium, tantalum, zirconium, cerium, tin, vanadium, and $LaSrVO_3$, and certain organic semiconductors, such as PTCDA, or 3,4,9,10-perylenetetracarboxylicacid-dianhydride.

19. An energy conversion device for conversion of chemical energy into electricity, comprising:
 a first electrode;
 a substrate connected to said first electrode;
 a porous semiconductor layer disposed over said substrate, said porous semiconductor layer having a nano-engineered structure;
 a porous catalyst material on at least a portion of said porous semiconductor layer, wherein at least some of the porous catalyst material enters the nano-engineered structure of the porous semiconductor layer to form an intertwining region, the porous catalyst material and the porous semiconductor layer forming solid-state junctions, wherein the solid-state junctions are conductor-dielectric-conductor junctions; and
 a second electrode, wherein electrons from the porous catalyst material are injected into the porous semiconductor layer, and wherein an electrical potential is formed between the first electrode and a second electrode during chemical reactions between a fuel, the porous catalyst material and the porous semiconductor network.

20. The energy conversion device of claim 19, wherein the substrate is patterned to create a three-dimensional surface, thereby providing increased surface area for chemical reactions.

21. The energy conversion device of claim 20, wherein the substrate is patterned such that nano-wires are formed.

22. The energy conversion device of claim 20, wherein the substrate is textured such that peaks and valleys are formed.

23. The energy conversion device of claim 19, further comprising a non-porous semiconductor layer is in between the substrate and the porous semiconductor layer.

24. The energy conversion device of claim 19, wherein the porous catalyst layer is formed with nano-particles.

25. The energy conversion device of claim 19 wherein the porous catalyst layer is formed with nano-clusters.

26. The energy conversion device of claim 19, wherein the porous catalyst layer is formed with nano-wires.

27. The energy conversion device of claim 19, wherein the porous semiconductor layer is formed with nano-particles.

28. The energy conversion device of claim 19 wherein the porous semiconductor layer is formed with nano-clusters.

29. The energy conversion device of claim 19, wherein the porous semiconductor layer is formed with nano-wires.

30. The energy conversion device of claim 19, wherein the porous semiconductor layer is a porous nano-engineered structure with percolating networks.

31. The energy conversion device of claim 19, wherein the porous semiconductor layer comprises a dielectric.

32. The energy conversion device of claim 31, wherein the dielectric is a porous nano-engineered structure with percolating networks.

33. The energy conversion device of claim 31, wherein the dielectric is formed with nano-particles.

34. The energy conversion device of claim 31 wherein the dielectric is formed with nano-clusters.

35. The energy conversion device of claim 31, wherein the dielectric is formed with the nano-wires.

36. The energy conversion device of claim 19, where the nanowire array or nano-engineered porous networks/layers are chosen from a group including rutile TiO2, anatase TiO2, poly-crystalline $TiO_2$ porous TiO2, ZrO2, $SrTiO_3$, BaTiO3, Sr_x-Ba_y-TiO_z, LiNiO, silicon, SiC, GaN, GaAs, Ge, silica, carbon, oxides of niobium, tantalum, zirconium, cerium, tin, vanadium, and $LaSrVO_3$, and certain organic semiconductors, such as PTCDA, or 3,4,9,10-perylenetetracarboxylicacid-dianhydride.

37. The energy conversation device of claim 1, wherein the fuel and the oxidizer comprise a monopropellant.

* * * * *